(12) United States Patent
Hori et al.

(10) Patent No.: US 8,529,132 B2
(45) Date of Patent: Sep. 10, 2013

(54) FLUID DYNAMIC BEARING DEVICE AND METHOD OF MANUFACTURING THE SAME

(75) Inventors: Masaharu Hori, Kuwana (JP); Masaaki Toda, Kuwana (JP)

(73) Assignee: NTN Corporation, Osaka-shi (JP)

( * ) Notice: Subject to any disclaimer, the term of this patent is extended or adjusted under 35 U.S.C. 154(b) by 673 days.

(21) Appl. No.: 12/303,808

(22) PCT Filed: May 28, 2007

(86) PCT No.: PCT/JP2007/060797
§ 371 (c)(1),
(2), (4) Date: Dec. 8, 2008

(87) PCT Pub. No.: WO2007/142062
PCT Pub. Date: Dec. 13, 2007

(65) Prior Publication Data
US 2010/0166344 A1    Jul. 1, 2010

(30) Foreign Application Priority Data

Jun. 7, 2006  (JP) ................................. 2006-158544
Jun. 7, 2006  (JP) ................................. 2006-158564

(51) Int. Cl.
*F16C 32/06*    (2006.01)

(52) U.S. Cl.
USPC ........................... 384/107; 384/112; 384/121

(58) Field of Classification Search
USPC ................. 384/112, 114, 121, 123, 107, 119; 417/354, 423.12, 423.13; 360/98.07, 99.08
See application file for complete search history.

(56) References Cited

U.S. PATENT DOCUMENTS

| | | | | |
|---|---|---|---|---|
| 3,951,573 A | * | 4/1976 | Dunning et al. | 417/423.13 |
| 3,960,468 A | * | 6/1976 | Boorse et al. | 417/423.13 |
| 4,254,961 A | * | 3/1981 | Fersht et al. | 384/100 |
| 5,516,212 A | * | 5/1996 | Titcomb | 384/107 |
| 5,580,175 A | * | 12/1996 | Polch et al. | 384/107 |
| 5,806,987 A | * | 9/1998 | Nose et al. | 384/100 |

(Continued)

FOREIGN PATENT DOCUMENTS

| | | |
|---|---|---|
| JP | 8-322191 A | 12/1996 |
| JP | 11-155254 A | 6/1999 |

(Continued)

OTHER PUBLICATIONS

International Search Report of PCT/JP2007/060797, date of mailing Sep. 4, 2007.

(Continued)

*Primary Examiner* — Daniel P. Stodola
*Assistant Examiner* — Matthew R McMahon
(74) *Attorney, Agent, or Firm* — Westerman, Hattori, Daniels & Adrian, LLP

(57) ABSTRACT

Provided is a fluid dynamic bearing device in which an assembly of a bearing sleeve to a housing is facilitated and which has excellent moment rigidity. A fluid dynamic bearing device (1) includes radial bearing parts (R1 and R2) and thrust bearing parts (T1 and T2). Thrust bearing surfaces (C and D) are respectively provided to first and second step surfaces (2*d* and 2*e*) of a housing (2), and the thrust bearing parts (T1 and T2) are respectively formed between the thrust bearing surfaces (C and D) and end surfaces (6*b* and 7*b*) of seal members (6 and 7) provided while protruding to an outer diameter side of a shaft member (5).

5 Claims, 13 Drawing Sheets

(56) References Cited

U.S. PATENT DOCUMENTS

| | | | |
|---|---|---|---|
| 6,371,649 B1* | 4/2002 | Kawawada et al. | 384/100 |
| 6,890,104 B2* | 5/2005 | Gomyo et al. | 384/119 |
| 7,092,203 B2* | 8/2006 | Inoue et al. | 360/98.07 |
| 7,435,001 B2* | 10/2008 | Kainoh et al. | 384/100 |
| 7,524,113 B2* | 4/2009 | Haga et al. | 384/123 |
| 7,578,621 B2* | 8/2009 | Nishimura et al. | 384/107 |
| 7,654,742 B2* | 2/2010 | Nishimoto et al. | 384/107 |
| 8,304,946 B2* | 11/2012 | Yu et al. | 310/90 |
| 2002/0196440 A1* | 12/2002 | Steinberg et al. | 356/399 |
| 2007/0286538 A1* | 12/2007 | Mizutani | 384/112 |
| 2008/0218019 A1* | 9/2008 | Sumi | 310/90 |

FOREIGN PATENT DOCUMENTS

| | | |
|---|---|---|
| JP | 11-269475 A | 10/1999 |
| JP | 2000-320542 A | 11/2000 |
| JP | 2003-139129 A | 5/2003 |
| JP | 2005-321089 A | 11/2005 |

OTHER PUBLICATIONS

Notification of Transmittal of Translation of the International Preliminary Report on Patentability (Form PCT/IB/338) of International Application No. PCT/JP2007/060797 mailed Jan. 22, 2009 with Forms PCT/IB/373 and PCT/ISA/237.

* cited by examiner

Fig. 6a
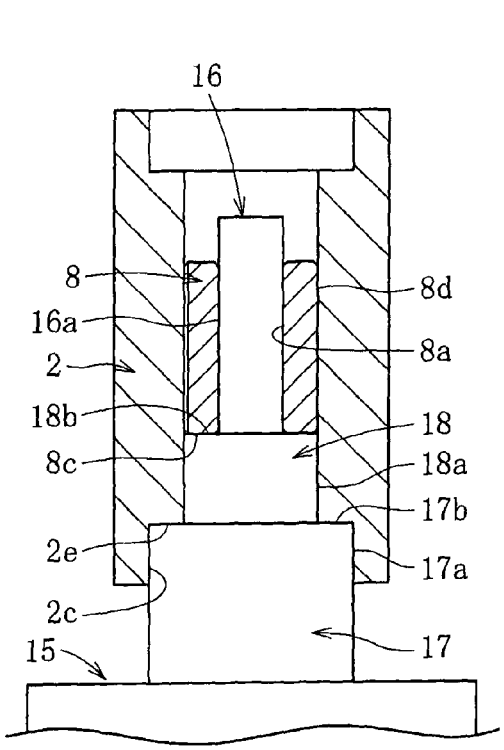
Fig. 6b
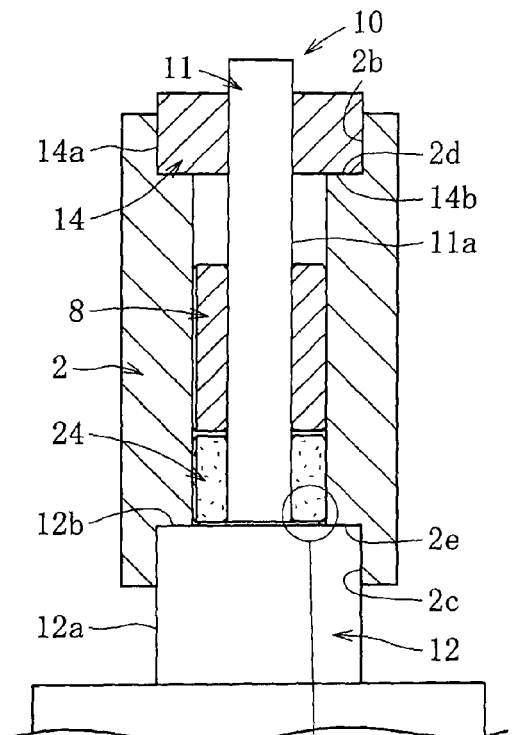
Fig. 6c
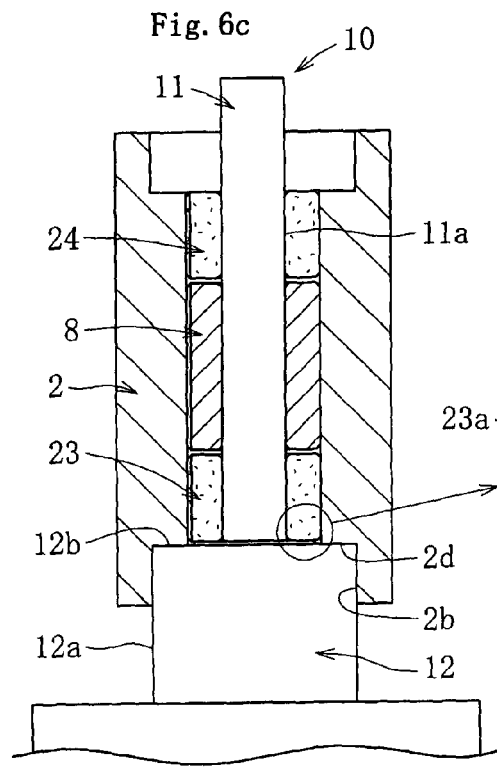
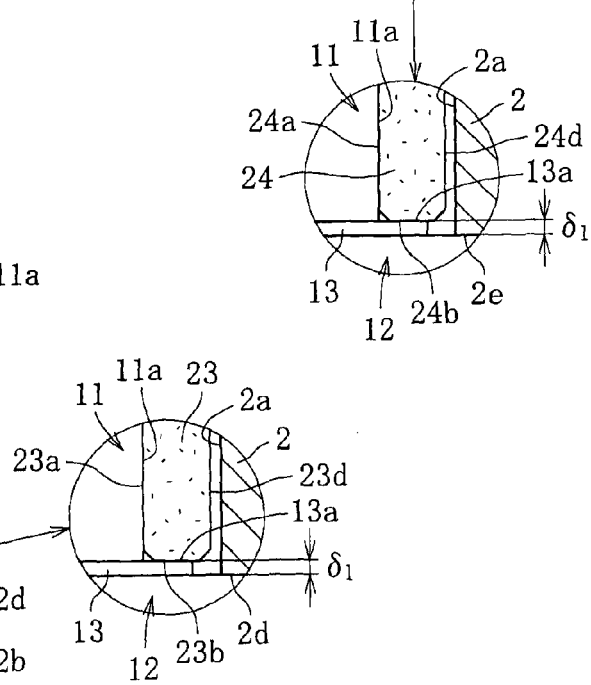

PRIOR ART

FLUID DYNAMIC BEARING DEVICE AND METHOD OF MANUFACTURING THE SAME

TECHNICAL FIELD

The present invention relates to a fluid dynamic bearing device and method of manufacturing the same.

BACKGROUND ART

A fluid dynamic bearing device supports a shaft member in a freely rotating manner with a lubricating film of fluid formed in a bearing gap. The fluid dynamic bearing device has characteristics of high-speed rotation, high rotational accuracy, low noise, and the like, and is recently being suitably used as a bearing for a motor mounted on various electric equipment such as information equipment, specifically, for a spindle motor of a magnetic disk device including an HDD, an optical disk device including a CD-ROM, a CD-R/RW, and a DVD-ROM/RAM, and a magneto optical disk device including MD and MO, for a polygon scanner motor of a laser beam printer (LBP), for a color wheel motor of a projector, and for a fan motor.

Examples of the fluid dynamic bearing device that is incorporated in the spindle motor for the disk device include one having the structure illustrated in FIG. 14. In the fluid dynamic bearing device illustrated in FIG. 14, a region that constitutes a radial bearing surface is provided at each of the two upper and lower points on an inner peripheral surface 208a of a single bearing sleeve 208 fixed to a housing 207, the radial bearing surface being provided with a dynamic pressure generating part. In addition, radial bearing parts R and R are formed between the radial bearing surfaces and an outer peripheral surface 201a of a shaft member 200 (shaft part 201). Further, regions that constitute thrust bearing surfaces are provided on both end surfaces 208b and 208c of the bearing sleeve 208, the thrust bearing surface being provided with a dynamic pressure generating part. In addition, thrust bearing parts T and T are formed between the thrust bearing surfaces and an end surface 202a of a flange part 202 which is provided while protruding on the outer diameter side of the shaft part 201, and an end surface 209b of a seal member 209 (refer to Patent Document 1, for example).

Note that, regarding the inner periphery of the housing, other than the above-mentioned case where the bearing sleeve is fixed at one point in the axial direction, there may be given a case where the bearing sleeve is fixed at two points in the axial direction (refer to Patent Document 2, for example). Further, there may be given a case where the spacer (also referred to as distance piece) is fixed between both the bearing sleeves which are fixed at the two points axially separated from each other (refer to Patent Document 3, for example).
Patent Document 1: JP 2005-321089 A
Patent Document 2: JP 11-269475 A
Patent Document 3: JP 11-155254 A The rotational accuracy of the fluid dynamic bearing device is largely influenced by accuracy of width of the radial bearing gap of the radial bearing part and the thrust bearing gap of the thrust bearing part. Therefore, it is necessary to assemble a bearing sleeve to a housing with accuracy. However, in the above-mentioned case where the bearing gaps are formed on the inner peripheral side and both the end sides of the bearing sleeve, it is necessary to fix the bearing sleeve to the housing while taking both the radial direction and the axial direction into consideration. Thus, the manufacturing cost thereof has sharply risen under present circumstances.

Further, in accordance with the increase in information processing amount and the like, the motor for information equipment including the above-mentioned spindle motor has been improved such that the lamination of the recording media and the high speed rotation can be achieved. In accordance therewith, it is necessary to impart to the fluid dynamic bearing device higher bearing strength and, in particular, more excellent load resistance (moment rigidity) to the moment load.

Incidentally, the structure in which the bearing sleeve is fixed at two points in the axial direction as described in Patent Documents 2 and 3 described above is advantageous for increasing moment rigidity when compared with that described in Patent Document 1. In contrast, it is necessary to give particular consideration to the accuracy in assembling between the bearing sleeves. This is because, when the bearing sleeve is fixed while being axially displaced, there may be risks that the arrangement spaces for the seal member and the lid member cannot be secured, and that a predetermined thrust bearing gap cannot be formed on the end side of the bearing sleeve. Further, this is also because, when both the bearing sleeves are fixed while being radially displaced from each other, the coaxiality between the radial bearing surfaces cannot be secured, which leads to the problems of the deterioration in rotational accuracy, the partial wear of the bearing sleeve, and the like. However, the housing and the bearing sleeve have dimensional tolerances, and hence it is difficult to perform positioning of those members with accuracy.

SUMMARY OF THE INVENTION

A first object of the present invention is to provide a fluid dynamic bearing device in which a bearing sleeve is easily assembled to a housing and which has high rotational accuracy, in particular, high load resistance to a moment load.

A second object of the present invention is to provide a method for performing an assembly of multiple bearing sleeves to the housing with ease and accuracy.

In order to attain the above-mentioned first object, the present invention provides a fluid dynamic bearing device, including: a bearing sleeve having a radial bearing surface; a housing having an inner periphery along which the bearing sleeve is fixed; a shaft member inserted along an inner periphery of the bearing sleeve; a protruding part provided while protruding to an outer diameter side of the shaft member so as to be arranged at each end of the bearing sleeve; a radial bearing gap formed between the radial bearing surface of the bearing sleeve and an outer peripheral surface of the shaft member; and a thrust bearing gap, the shaft member being supported in a non-contact manner with use of a dynamic pressure effect of lubricant fluid generated in both the bearing gaps, in which the housing has a small diameter inner peripheral surface as a fixing part of the bearing sleeve, a large diameter inner peripheral surface positioned on an outer diameter side of the protruding part, and a step surface connecting the small diameter inner peripheral surface and the large diameter inner peripheral surface, the step surface being provided with a thrust bearing surface in which the thrust bearing gap is formed. Note that, the radial bearing surface and the thrust bearing surface are intended in this case as surfaces with which the radial bearing gap and the thrust bearing gap are formed. It does not matter whether or not a dynamic pressure generating part such as dynamic pressure grooves is formed on the surfaces.

In the above-mentioned structure, the thrust bearing surface is provided to the step surface of the housing, and the bearing sleeve does not have an influence on the formation of the thrust bearing gap. As a result, it suffices that the assembly of both the bearing sleeves to the housing is performed while only the axial direction is taken into consideration. Accordingly, it is possible to facilitate the assembly of the bearing sleeve, to thereby achieve cost reduction of the fluid dynamic bearing device. Further, the thrust bearing gap (thrust bearing surface) can be formed on the outer diameter side when compared with that in the conventional structure, and hence it is possible to increase the rotational accuracy in accordance with increase in the bearing area.

Incidentally, the moment rigidity, in particular, the rotational accuracy is effectively increased by means for increasing the bearing span of the radial bearing part. While it is necessary to increase the size of the bearing sleeve for the purpose of increasing the bearing span, it is difficult to secure the accuracy of the bearing sleeve in accordance with the increase in size thereof in some cases. In particular, in the case where the bearing sleeve is made of a sintered metal, there is a risk that it is difficult to obtain uniform density in the powder molding thereof, with the result that desired bearing performance cannot be exerted. Accordingly, there is a limitation in further increasing the bearing span of the radial bearing part with use of a single bearing sleeve.

Under the circumstances, the present invention provides, in addition to the above-mentioned structure, a structure in which multiple bearing sleeves are arranged in the axial direction. With this structure, it is possible to increase the span between the radial bearing parts so as to increase the load resistance to the moment load, and to facilitate the manufacture of the bearing sleeve. When the multiple bearing sleeves are provided in the axial direction as described above, there are problems with the coaxiality between the radial bearing surfaces of the bearing sleeves and with the perpendicularity of the radial bearing surfaces of the bearing sleeves with respect to the thrust bearing surfaces of the housing. In this context, with the coaxiality being set to be equal to or smaller than 3 μm between the radial bearing surfaces of the bearing sleeves and with the perpendicularity being set to be equal to or smaller than 5 μm between the radial bearing surfaces of the bearing sleeves and the thrust bearing surfaces of the housing, it is possible to prevent failures including deterioration in rotational accuracy and wear of the members.

As means for fixing the bearing sleeve to the housing, it is desirable to adopt gap-filling bonding. The gap-filling bonding is a method of performing fixation by bonding, in which the outer peripheral surface of the bearing sleeve and the inner peripheral surface of the housing are engaged with each other by clearance fit. Even when there is a variation between the shapes of the bearing sleeves, in particular, the radial shapes thereof, the variation can be absorbed with use of a gap eliminated by bonding. By means of a fixation method involving press-fitting (such as press-fitting or press-fit bonding), the inner peripheral surface of the bearing sleeve is conformed to the shape of the outer peripheral surface thereof, and hence it is difficult to secure the coaxiality between the radial bearing surfaces and the accuracy between the radial bearing gaps in some cases. However, the problems of this type do not occur when the fixation is performed by gap-filling bonding. The structure is particularly effective in the case where multiple bearing sleeves are used.

When the housing is formed by die molding, it is possible to facilitate the mass-production of the housing, to thereby achieve additional cost reduction of the fluid dynamic bearing device. Further, when the dynamic pressure generating part such as dynamic pressure grooves for generating fluid dynamic pressure in the thrust bearing gap are formed in the thrust bearing surface provided to the step surface of the housing, the dynamic pressure generating part can be formed simultaneously with the molding of the housing by merely forming the molding die conforming to the shape of the dynamic pressure generating part on the molding part of the step surface of the housing when the housing is molded. For example, when the dynamic pressure grooves of this type is formed in the end surface of the bearing sleeve made of a sintered metal, the increase in working cost as a result of the increase in the number of processings is concerned. However, the increases in the costs can be prevented with the above-mentioned structure.

When the bearing sleeves are arranged at multiple points in the axial direction, it is possible to provide a non-porous spacer between the adjacent two bearing sleeves. With this structure, the amount of the lubricant fluid to be filled in the bearing can be reduced, and hence the volume (axial dimension) of the seal space provided at the opening part of the housing can be reduced. As a result, it is possible to further increase the bearing span of the radial bearing part, in other words, the moment rigidity.

Further, in order to attain the above-mentioned second object, the present invention provides a manufacturing method for a fluid dynamic bearing device, comprising: in fixation of bearing sleeves at two points in an axial direction of an inner periphery of a housing, each of the bearing sleeves having a radial bearing surface and comprising a radial bearing gap between a shaft to be supported, opening both ends of the housing; subjecting one of the bearing sleeves to gap-filling bonding to the housing while securing a clearance measured from one end surface of the housing; and subjecting another bearing sleeve to gap-filling bonding to the housing while securing a clearance measured from another end surface of the housing.

As described above, both ends of the housing are opened, and two bearing sleeves are fixed while clearances from the end surface of the housing are secured. With this structure, it is possible to secure a predetermined space on the end side of each of the bearing sleeves. Accordingly, for example, when the seal member, a lid member, and the like are provided on outer end side of each of both the bearing sleeves which are fixed while required axial dimensions thereof are secured in advance, those members can be reliably fixed or arranged along the inner periphery of the hosing. Alternatively, for example, when the thrust bearing part is provided on the outer end side of each of both the bearing sleeves, it is also possible to form a predetermined thrust bearing gap between the rotating body (such as flange part of shaft member) and the bearing sleeves.

Further, for example, by means of gap-filling bonding of the two bearing sleeves to the inner periphery of the housing, even when there is a variation between the thicknesses and the outer peripheral shapes of the bearing sleeves, the variation can be absorbed with use of a gap eliminated by bonding, which is desirable. For example, by means of a fixation method involving press-fitting (such as press-fitting or press-fit bonding), the shapes of the radial bearing surfaces are conformed to the shapes of the outer peripheral surfaces of the bearing sleeves and the like owing to the variation between the shapes, and hence it is difficult to secure the coaxiality between the radial bearing surfaces in some cases. However, the problems of this type do not occur when the fixation is performed by gap-filling bonding. Note that it is desirable that the radial bearing surfaces of the bearing sleeves be restrained from movement when the bearing sleeves are subjected to gap-filling bonding. With this structure, it is possible to perform positioning in the axial direction with reference to the radial bearing surfaces, whereby the two bearing sleeves are fixed while the coaxiality is maintained between the radial bearing surfaces.

Various adhesives including a thermosetting adhesive, a UV-curable adhesive, or a cold-setting adhesive may be used. It is desirable that a cold-setting adhesive be used for which a special curing device is not required and which is curable in a short period of time. In particular, it is desirable that an anaerobic adhesive be used which can reliably effect fixation by bonding while blocking air (achieving vacuum state) such that a special confirmation operation thereof is omitted.

In addition to the above-mentioned members, a spacer can be provided between both the bearing sleeves. In this case, it is possible to fix the spacer along the inner periphery of the housing while a clearance is secured from the end surface of the housing.

From the above description, according to the present invention, it is possible to provide the fluid dynamic bearing device in which the bearing sleeve is easily assembled to the housing and which has high rotational accuracy, in particular, high load resistance to the moment load.

Further, according to the present invention, it is possible to perform the assembly of the multiple bearing sleeves to the housing with ease and accuracy.

BRIEF DESCRIPTION OF THE DRAWINGS

FIGS. 6a to 6c are schematic views illustrating a manufacturing process of the fluid dynamic bearing device according to the second embodiment.

DETAILED DESCRIPTION OF THE INVENTION

A fluid dynamic bearing device according to the present invention and an embodiment for a manufacturing method therefor are hereinafter described with reference to the drawings. Here, an "upper and lower" direction referred to in the following description merely indicates the upper and lower direction in each drawing for the sake of convenience, and does not limit an installing direction, a use mode, and the like of the fluid dynamic bearing device.

Figure 1:
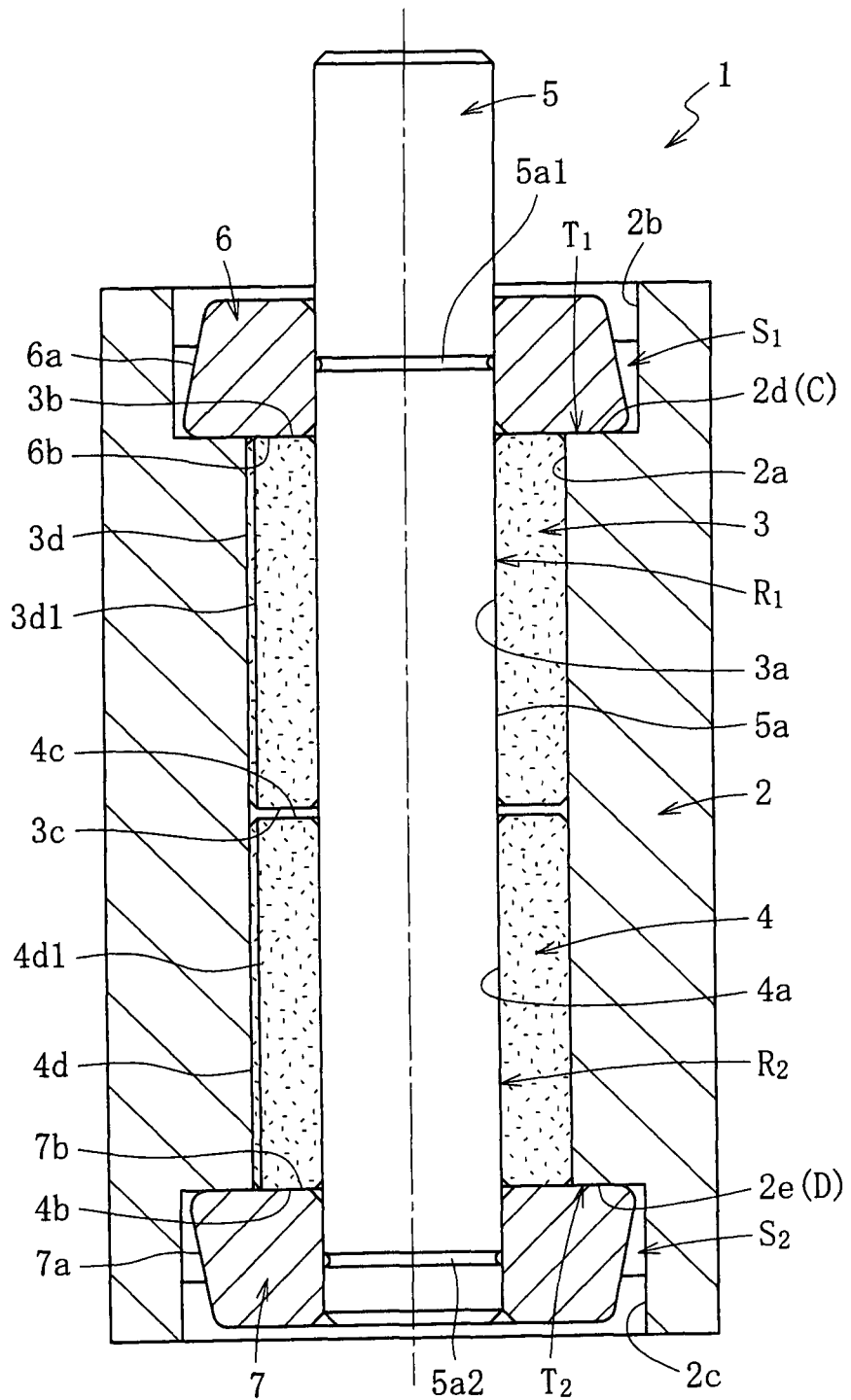
FIG. 1 is a sectional view of a fluid dynamic bearing device according to a first embodiment of the present invention.

FIG. 1 illustrates a fluid dynamic bearing device 1 according to a first embodiment of the present invention. The fluid dynamic bearing device 1 is used while being incorporated, for example, in a spindle motor for an HDD. The fluid dynamic bearing device 1 includes a housing 2, multiple (two in this case) bearing sleeves (first bearing sleeve 3 and second bearing sleeve 4) fixed to the housing 2, a shaft member 5 inserted along the inner peripheries of both the bearing sleeves 3 and 4, and seal members 6 and 7 as protruding parts protruding to the outer diameter side of the shaft member 5.

While described later in detail, in the fluid dynamic bearing device 1 of the illustrated example, there are provided a first radial bearing part R1 between an inner peripheral surface 3a of the first bearing sleeve 3 and an outer peripheral surface 5a of the shaft member 5, and a second radial bearing part R2 between an inner peripheral surface 4a of the second bearing sleeve 4 and an outer peripheral surface 5a of the shaft member 5. Further, in this embodiment, there are provided a first thrust bearing part T1 between a first step surface 2d of the housing 2 and an lower end surface 6b of the seal member 6, and a second thrust bearing part T2 between a second step surface 2e of the housing 2 and an upper end surface 7b of the seal member 7.

The housing 2 is formed in a substantially cylindrical shape by injection molding of a molten material such as a molten resin, and the inner peripheral surface thereof is partitioned into a small diameter inner peripheral surface 2a as a fixing part of the bearing sleeves 3 and 4, and first and second large diameter inner peripheral surfaces 2b and 2c provided at both ends of the small diameter inner peripheral surface 2a and each having a diameter larger than that of the small diameter inner peripheral surface 2a. The first and second large diameter inner peripheral surfaces 2b and 2c are continuous with the small diameter inner peripheral surface 2a through an intermediation of the first and second step surfaces 2d and 2e, respectively. The small diameter inner peripheral surface 2a of the housing 2 is formed to have a diameter somewhat larger than outer diameter dimensions of the first and second bearing sleeves 3 and 4.

Figure 2A:
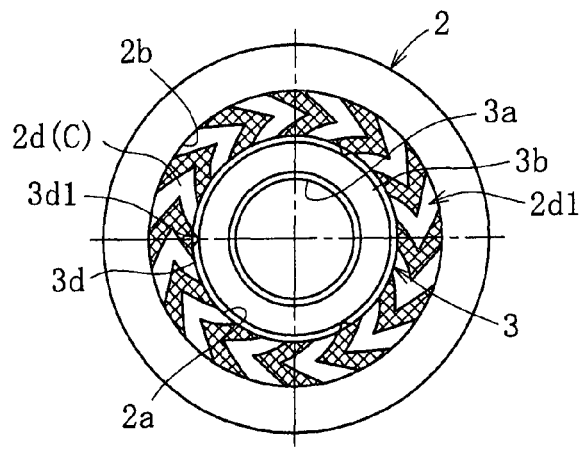
FIG. 2a is a top view illustrating a state in which bearing sleeves are assembled to a housing.

As illustrated in FIG. 2a, a region that constitutes a thrust bearing surface C of the first thrust bearing part T1 is formed in a part of or entire annular region of the first step surface 2d of the housing 2, and in the thrust bearing surface C, multiple dynamic pressure grooves 2d1 are formed as dynamic pressure generating parts while being arranged in a herringbone pattern. Further, as illustrated in FIG. 2c, a region that constitutes a thrust bearing surface D of the second thrust bearing part T2 is formed in a part of or entire annular region of the second step surface 2e of the housing 2, and in the thrust bearing surface D, multiple dynamic pressure grooves 2e1 are formed as dynamic pressure generating parts while being arranged in a herringbone pattern. Note that, one of or both the dynamic pressure grooves 2d1 and 2e1 may be arranged in another well-known pattern such as a spiral pattern. With the provision of a molding part corresponding to the patterns of the dynamic pressure grooves for the regions of the forming die of the housing 2, in which the thrust bearing surfaces C and D are formed, the above-mentioned dynamic pressure grooves 2d1 and 2e1 are formed by die molding simultaneously with the molding of the housing 2.

For the base resin used for the molding of the housing 2, any type can be used as long as it can be injection molded regardless of whether it is amorphous resin or crystalline resin. For example, polysulfone (PSU), polyethersulfone (PES), polyphenylsulfone (PPSU), polyetherimide (PEI), and the like are used for amorphous resin, and liquid crystal polymer (LCP), polyether ether ketone (PEEK), polybutylene telephtalate (PBT), polyphenylene sulfide (PPS), and the like are used for crystalline resin. Those are obviously just examples, and other base resin can be used in view of use environment, an application, etc. Further, for the purposes of increasing strength and imparting conductivity, one or two or more types of well-known various fillers may be compounded with the above-mentioned base resins.

Further, the housing 2 may be formed by injection molding of a molten metal. As a metal material, a low-melting metal material such as a magnesium alloy or an aluminum alloy is available. In this case, the strength and the conductivity can be increased when compared with those in the case of using a resin material. Alternatively, it is possible to adopt so-called MIM molding in which the mixture of metal powder and a binder is degreased and sintered after injection molding thereof. Still alternatively, it is possible to adopt injection molding of ceramic (so-called CIM molding).

The shaft member 5 is made of a metal material such as stainless steel, and has a shaft shape of substantially the same diameter in general. In addition, in this embodiment, the annular seal members 6 and 7 are fixed to the shaft member 5 by an appropriate fixing means such as adhesion or press-fit adhesion (simultaneous use of press-fitting and adhesion). The seal members 6 and 7 are protruded to an outer diameter side from the outer peripheral surface 5a of the shaft member 5, and are accommodated on the inner peripheral side of the first large diameter inner peripheral surface 2b and the second large diameter inner peripheral surface 2c of the housing 2, respectively. In order to enhance the fixing strength of adhesive, circumferential grooves 5a1 and 5a2 acting as adhesive pool are provided on the outer peripheral surface 5a of the shaft member 5 that constitutes the fixing positions of the seal members 6 and 7. The seal members 6 and 7 may be made of a soft metal material such as brass or other metal materials, or may be made of a resin material. In order to achieve reduction in the number of components and an assembly man-hour, any one of the seal members 6 and 7 may be integrally formed with the shaft member 5.

The outer peripheral surface 6a of the seal member 6 forms a seal space S1 of a predetermined volume between itself and the first large diameter inner peripheral surface 2b of the housing 2, and the outer peripheral surface 7a of the seal member 7 forms a seal space S2 of a predetermined volume between itself and the second large diameter inner peripheral surface 2c of the housing 2. In this embodiment, the outer peripheral surface 6a of the seal member 6 and the outer peripheral surface 7a of the seal member 7 are respectively formed into a tapered surface shape in which diameter thereof gradually narrows towards the exterior side of the housing 2. Thus, the seal spaces S1 and S2 have a tapered shape gradually narrowing towards the interior side of the housing 2.

Figure 3:
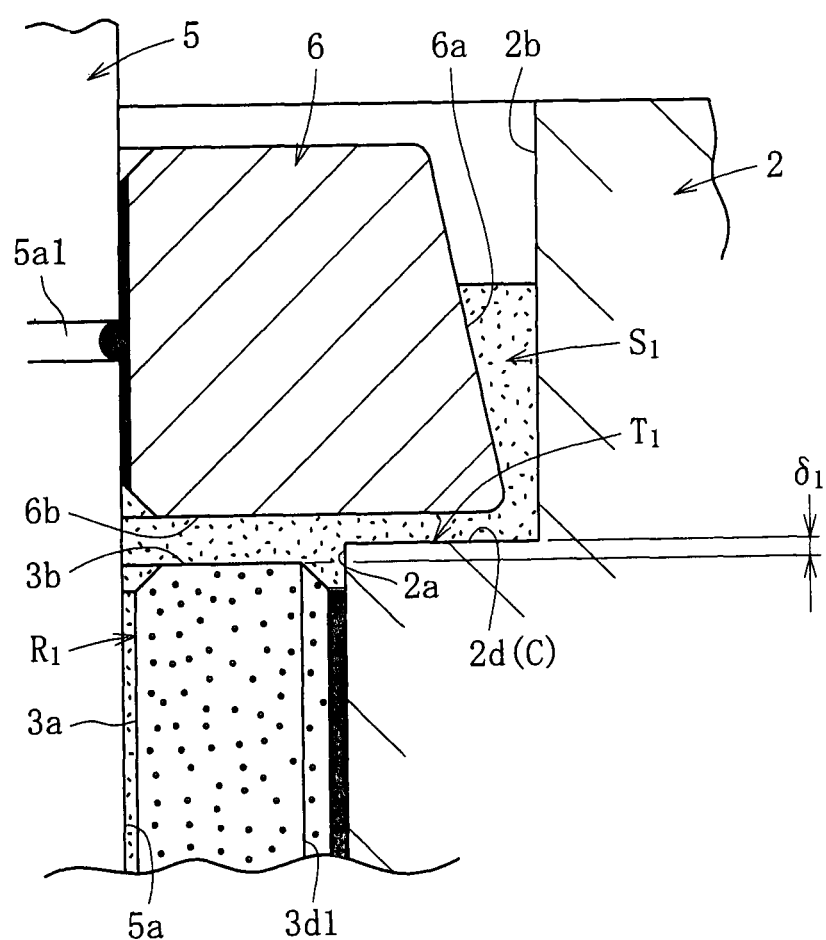
FIG. 3 is an enlarged sectional view of an upper part of the housing.

The first and second bearing sleeves 3 and 4 are both formed into a cylindrical shape with a porous body made of a sintered metal, in particular, with a porous body of a sintered metal having copper as main component. In this embodiment, the first bearing sleeve 3 is fixed to the small diameter inner peripheral surface 2a of the housing 2 such that an upper end surface 3b thereof is positioned below the first step surface 2d of the housing 2 in the axial direction by $\delta 1$ (refer to FIG. 3). Further, while not shown, as in the case of the first bearing sleeve 3, the second bearing sleeve 4 is fixed to the small diameter inner peripheral surface 2a of the housing 2 such that a lower end surface 4b thereof is positioned above the second step surface 2e of the housing 2 in the axial direction by a predetermined dimension ($\delta 1$). Note that, the bearing sleeves 3 and 4 may be made of a solid soft metal material such as a copper alloy other than a sintered metal.

Figure 2B:
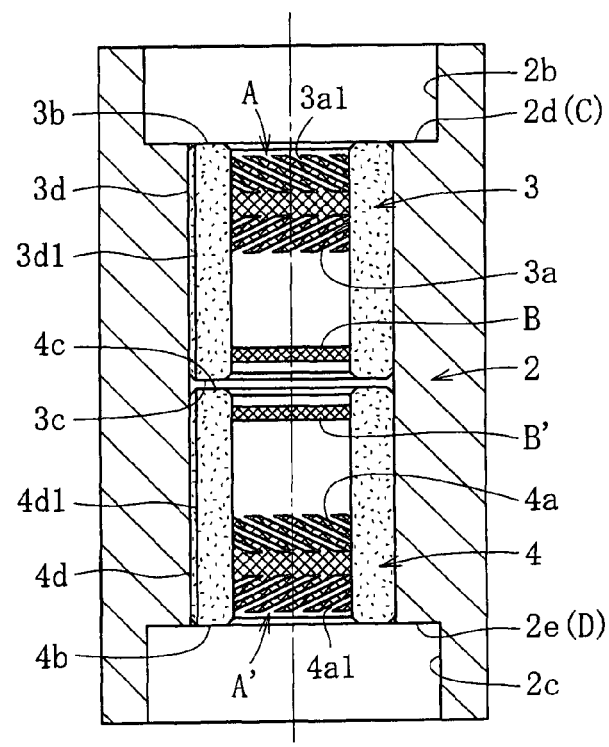
FIG. 2b is a sectional view thereof.
Figure 2C:
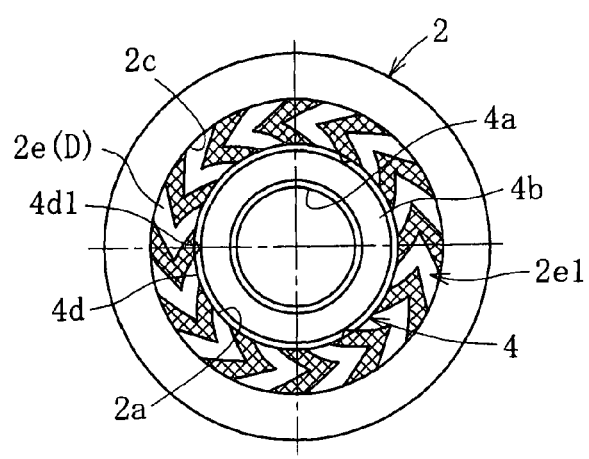
FIG. 2c is a bottom view thereof.

As illustrated in FIG. 2b, a region that constitutes a radial bearing surface A of the first radial bearing part R1 is formed in the inner peripheral surface 3a of the first bearing sleeve 3, and in the radial bearing surface A, multiple dynamic pressure grooves 3a1 are formed as dynamic pressure generating parts while being arranged in a herringbone pattern. The radial bearing surface A is formed at an end on the side (upper side) away from the second bearing sleeve 4. A band-shaped convex part B is formed at an end on the opposite side (lower side) axially spaced apart from the radial bearing surface A of the inner peripheral surface 3a. The convex part B is formed to have substantially the same (exactly the same) diameter as that of a hill part that partitions and forms the dynamic pressure groove 3a1. Multiple (three in the illustrated example) axial grooves 3d1 are equiangularly formed in an outer peripheral surface 3d.

Further, a region that constitutes a radial bearing surface A' of the second radial bearing part R2 is formed in the inner peripheral surface 4a of the second bearing sleeve 4. In the radial bearing surface A', multiple dynamic pressure grooves 4a1 are arranged in a herringbone pattern as dynamic pressure generating parts. The radial bearing surface A' is formed at the end on the side (lower side) away from the first bearing sleeve 3. Further, a band-shaped convex part B' is formed at the end on the opposite side (upper side) axially spaced apart from the radial bearing surface A' of the inner peripheral surface 4a. The convex part B' is formed to have substantially the same (exactly the same) diameter as that of a hill part that partitions and forms the dynamic pressure groove 4a1. Multiple (three in the illustrated example) axial grooves 4d1 are equiangularly formed in an outer peripheral surface 4d.

In this embodiment, both the bearing sleeves 3 and 4 are fixed to the small diameter inner peripheral surface 2a of the housing 2 such that the coaxiality between the radial bearing surfaces A and A' respectively provided to the inner peripheral surfaces 3a and 4a thereof is set to be equal to or smaller than 3 μm. Further, both the bearing sleeves 3 and 4 are fixed to the small diameter inner peripheral surface 2a of the housing 2 such that the radial bearing surfaces A and A' respectively provided to the inner peripheral surfaces 3a and 4a thereof have the perpendicularity equal to or smaller than 5 μm with respect to the respective thrust bearing surfaces C and D provided to the first and second step surfaces 2d and 2e of the housing 2, respectively.

Next, while putting an emphasis on the process of assembling both the bearing sleeves 3 and 4 to the housing 2, an assembly method for the fluid dynamic bearing device 1 having the above-mentioned structure is described with reference to the drawings.

Figure 4A:
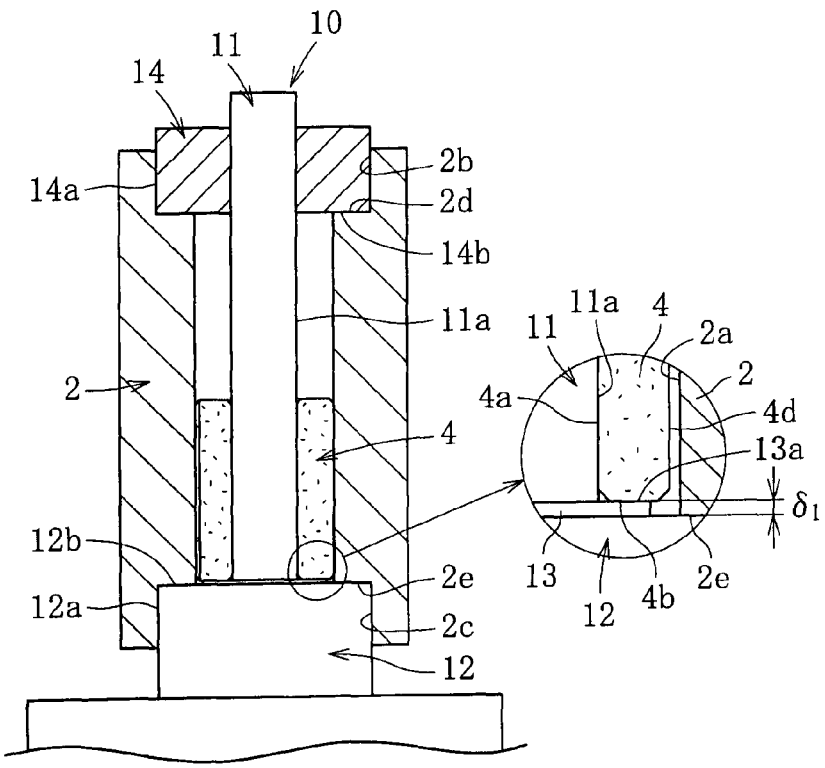
FIGS. 4a and 4b are schematic views illustrating a manufacturing process of the fluid dynamic bearing device according to the first embodiment.
Figure 4B:
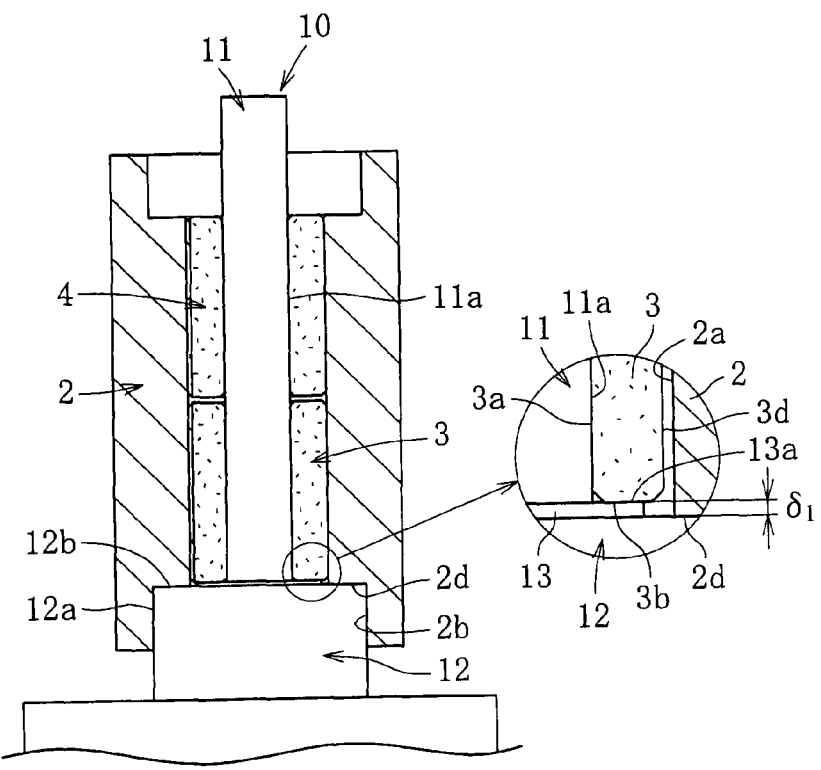

FIGS. 4a and 4b conceptually illustrate a process of positioning and fixing the first and second bearing sleeves 3 and 4 to the small diameter inner peripheral surface 2a of the housing 2. An assembly device 10 used in the process includes a base part 12, a positioning part 13 axially protruding by $\delta 1$ from an upper end surface 12b of the base part 12, a pin part 11 axially extended upward from an upper end surface 13a of the positioning part 13, and a disk part 14 externally engaged at the upper end of the pin part 11. The pin part 11 is formed to have such an outer diameter dimension as the bearing sleeves 3 and 4 can slide the respective radial bearing surfaces A and A' of the bearing sleeves 3 and 4 are not damaged.

In the above-mentioned assembly device 10, the accuracy of an outer peripheral surface 11a of the pin part 11 directly influences the coaxiality of the radial bearing surface A' of the second bearing sleeve 4 with respect to the radial bearing surface A of the first bearing sleeve 3. Therefore, the outer peripheral surface 11a of the pin part 11 is finished so as to suffice the required coaxiality (equal to or smaller than 3 μm). Further, the perpendicularity between the upper end surface 12b of the base part 12 and the outer peripheral surface 11a of the pin part 11, the molding accuracy of the disk part 14, and the assembly accuracy of the disk part 14 in a state of being externally engaged with the pin part 11 directly influence the perpendicularity of the radial bearing surfaces A and A' of the respective bearing sleeves 3 and 4 with respect to the thrust bearing surfaces C and D respectively provided to the step surfaces 2d and 2e of the housing 2. Therefore, those parts are finished so as to suffice the required perpendicularity (equal to or smaller than 5 μm). Still further, an outer peripheral surface 12a of the base part 12 and an outer peripheral surface 14a of the disk part 14 are finished so as to prevent backlash caused between the large diameter inner peripheral surfaces 2b and 2c of the housing 2 and so as not to deteriorate the above-mentioned accuracies.

In the above-mentioned structure, as illustrated in FIG. 4a, first, the second bearing sleeve 4 is press-fitted (slightly press-fitted) into the pin part 11 such that the lower end surface 4b thereof is brought into contact with the upper end surface 13a of the positioning part 13. Next, in a state where an adhesive is applied over a predetermined region of the small diameter inner peripheral surface 2a of the housing 2, the second step surface 2e of the housing 2 is arranged on the outer diameter side of the second bearing sleeve 4 so as to be brought into contact with the upper end surface 12b of the base part 12. Further, the disk part 14 is externally engaged with the pin part 11 while a lower end surface 14b thereof is brought into contact with the first step surface 2d of the housing 2.

Note that, an adhesive such as a thermosetting adhesive, a photo-setting adhesive, or a cold-setting adhesive may be used. In this embodiment, a cold-setting adhesive is used for which a special curing device is not required and which is curable in a short period of time, and especially, an anaerobic adhesive is used which can reliably effect fixation by bonding while blocking air such that a special confirmation operation thereof is omitted.

As described above, the convex part B' having substantially the same diameter as that of the radial bearing surface A' is provided in the region of the inner peripheral surface 4a of the second bearing sleeve 4, which is axially spaced apart from the radial bearing surface A'. Accordingly, by means of the assembly in the above-mentioned mode, the coaxiality of the inner peripheral surface 4a of the second bearing sleeve 4 is secured with respect to the small diameter inner peripheral surface 2a of the housing 2, and the orthgonality of the radial bearing surface A' of the second bearing sleeve 4 is secured with respect to the thrust bearing surface D provided to the second step surface 2e of the housing 2. In this context, by maintaining this state for a while so as to cure the adhesive, the second bearing sleeve 4 is fixed by bonding to the small diameter inner peripheral surface 2a of the housing 2 while the lower end surface 4b thereof is positioned at a point which is axially spaced apart from the second step surface 2e of the housing 2 by δ1.

The above-mentioned assembled article is once detached from the assembly device 10. Next, as illustrated in FIG. 4b, the first bearing sleeve 3 is press-fitted into the pin part 11 such that the upper end surface 3b is brought into contact with the upper end surface 13a of the positioning part 13. Then, in a state where the top and bottom of the above-mentioned assembled article is inverted and an adhesive is applied over the predetermined region of the small diameter inner peripheral surface 2a of the housing 2, the above-mentioned assembled article is arranged on the outer diameter side of the first bearing sleeve 3 such that the first step surface 2d of the housing 2 is brought into contact with the upper end surface 12b of the base part 12. When this state is maintained for a while so as to cure the adhesive, the first bearing sleeve 3 is fixed by bonding to the small diameter inner peripheral surface 2a of the housing 2 while the upper end surface 3b thereof is positioned at a point which is axially spaced apart from the first step surface 2d of the housing 2 by δ1.

In this case, as in the above-mentioned case, the convex part B having substantially the same diameter as that of the radial bearing surface A is provided also on the inner peripheral surface 3a of the first bearing sleeve 3. Thus, by means of the assembly in the above-mentioned mode, the coaxiality of the inner peripheral surface 3a (radial bearing surface A) of the first bearing sleeve 3 is secured with respect to the small diameter inner peripheral surface 2a of the housing 2, and the perpendicularity of the radial bearing surface A of the first bearing sleeve 3 is secured with respect to the thrust bearing surface B provided to the first step surface 2d of the housing 2. Further, both the first bearing sleeve 3 and the second bearing sleeve 4 are press-fitted into the pin part 11, and hence a predetermined coaxiality (within 3 μm) is secured between the radial bearing surface A of the first bearing sleeve 3 and the radial bearing surface A' of the second bearing sleeve 4. Note that, in the state illustrated in FIG. 4b, the second bearing sleeve 4 is positioned on the upper outer diameter side of the pin part 11, and hence the posture of the housing 2 is not deteriorated even without the disk part 14 externally engaged at the upper end of the pin part 11 as illustrated in FIG. 4a, whereby the demanded accuracy is secured. As a matter of course, as in the case where the second bearing sleeve 4 is fixed to the housing 2, the disk part 14 may be used for positioning.

Incidentally, as described above, the small diameter inner peripheral surface 2a of the housing 2 is formed to have a diameter larger than those of the respective outer peripheral surfaces 3d and 4d of both the bearing sleeves 3 and 4. Accordingly, the fixation by bonding of both the bearing sleeves 3 and 4 to the housing 2 is so-called gap-filling bonding. By means of the gap-filling bonding, even when there is a variation between the radial shapes of the bearing sleeves 3 and 4, the variation can be absorbed with use of a gap eliminated by bonding. As a result, the coaxiality can be reliably secured between both the radial bearing surfaces A and A'. Note that, the excessively large width of the gap eliminated by bonding leads to the deterioration in bonding strength, and in contrast, the excessively small width thereof leads to the insufficiency of radial adjustment allowance. For this reason, the width of the gap eliminated by bonding is set to 10 μm to 50 μm, or more preferably, approximately to 15 μm to 20 μm.

While in the above description, the second bearing sleeve 4 is fixed first, as a matter of course, the second bearing sleeve 4 may be fixed to the housing 2 after the fixation of the first bearing sleeve 3 to the housing 2. Further, the above-mentioned assembly process may be performed after the application of an adhesive on the outer peripheral surfaces of the bearing sleeves 3 and 4 instead of the small diameter inner peripheral surface 2a of the housing 2.

By means of the fixation of both the bearing sleeves 3 and 4 to the housing 2 as described above, the first bearing sleeve 3 is fixed while the upper end surface 3b thereof is axially spaced apart from the first step surface 2d of the housing 2 by δ1. Further, the second bearing sleeve 4 is also fixed while the lower end surface 4b thereof is axially spaced apart from the second step surface 2e of the housing 2 by δ1. Simultaneously, a predetermined coaxiality (equal to or smaller than 3 μm) is secured between the respective radial bearing surfaces A and A' of both the bearing sleeves 3 and 4, and the perpendicularity (equal to or smaller than 5 μm) of the radial bearing surfaces A and A' of the respective bearing sleeves 3 and 4 is secured with respect to the thrust bearing surfaces C and D respectively provided to the first and second step surfaces 2d and 2e of the housing 2. Then, the shaft member 5 is inserted along the inner peripheries of both the bearing sleeves 3 and 4, and both the seal members 6 and 7 are respectively fixed by bonding to the outer peripheries of the circumferential grooves 5a1 and 5a2 of the shaft member 5 while maintaining a predetermined axial gap width. In this case, for the simplification of the assembly of the seal members, any one of the seal members 6 and 7 may be fixed in advance to the shaft member 5 prior to insertion, or may be formed integrally with the shaft member 5.

Note that, as a result of the fixation of both the bearing sleeves 3 and 4 to the small diameter inner peripheral surface 2a of the housing 2 in the above-mentioned mode, as illustrated in FIGS. 1 and 2, a slight gap is formed in some cases between a lower end surface 3c of the first bearing sleeve 3 and an upper end surface 4c of the second bearing sleeve 4. As a matter of course, both the bearing sleeves 3 and 4 are brought into contact with each other in some cases owing to the axial dimensions of the first and second bearing sleeves 3 and 4 and the housing 2.

After the assembly is completed through the above-mentioned processes, lubricating oil etc. is filled as lubricant fluid to the internal space of the housing 2 sealed with the seal members 6 and 7 including an internal air hole of both the bearing sleeves 3 and 4. The lubricating oil can be filled by immersing the assembly-completed fluid dynamic bearing device 1 in the lubricating oil in a vacuum bath and then being opened to atmospheric pressure.

In the fluid dynamic bearing device 1 of the above-mentioned structure, when the shaft member 5 rotates, the radial bearing surface A of the inner peripheral surface 3a of the first bearing sleeve 3 faces the outer peripheral surface 5a of the shaft member 5 through an intermediation of the radial bearing gap. In the radial bearing surface A, the pressure of the lubricating oil filled in the radial bearing gap is increased by the dynamic pressure effect of the dynamic pressure groove 3a1, and the shaft member 5 is rotatably supported in a non-contact manner in the radial direction by this pressure. In this embodiment, the radial bearing gap is formed between the convex part B and the outer peripheral surface 5a of the shaft member 5, and an oil film is formed in the radial bearing gap by the oil exuded from the first bearing sleeve 3, and hence the shaft member 5 is rotatably supported in the radial direction by the oil film. Thus, the dynamic pressure bearing and a cylindrical bearing constitute the first radial bearing part R1 that rotatably supports the shaft member 5 in the radial direction. In the second bearing sleeve 4 as well, the dynamic pressure bearing is constructed of the radial bearing surface A', the cylindrical bearing is constructed of the convex part B', and the second radial bearing part R2 that rotatably supports the shaft member 5 in the radial direction is constructed.

Further, when the shaft member 5 rotates, the thrust bearing surface C formed in the first step surface 2d of the housing 2 faces the lower end surface 6b of the seal member 6 through the intermediation of the predetermined thrust bearing gap, and the thrust bearing surface D formed in the second step surface 2e of the housing 2 faces the upper end surface 7b of the seal member 7 through the intermediation of the predetermined thrust bearing gap. With the rotation of the shaft member 5, the pressure of the lubricating oil filled in each thrust bearing gap is increased by the dynamic pressure effect of the dynamic pressure grooves 2d1 and 2e1, and the shaft member 5 is rotatably supported in a non-contact manner in both thrust directions. The first thrust bearing part T1 and the second thrust bearing part T2 for rotatably supporting the shaft member 5 in a non-contact manner in both thrust directions are thereby formed.

In the rotation of the shaft member 5, the seal spaces S1 and S2 formed on the side of the outer peripheral surface 6a of the seal member 6 and on the side of the outer peripheral surface 7a of the seal member 7 have a tapered shape gradually narrowing towards the inner side of the housing 2, as described above, and hence the lubricating oil in both the seal spaces S1 and S2 is drawn in the direction in which the seal spaces narrow, that is, towards the inner side of the housing 2 by the drawing action by the capillary force and the drawing action by centrifugal force in rotation. The leakage of the lubricating oil from the interior of the housing 2 is thereby effectively prevented. Further, the seal spaces S1 and S2 have a buffer function of absorbing the amount of change in volume involved in the change in temperature of the lubricating oil filled in the interior space of the housing 2, and the oil level of the lubricating oil is always within the seal spaces S1 and S2 within a range of the expected temperature change.

Further, a series of circulating paths is formed inside the housing 2 by a fluid path formed by the axial groove 3d1 of the first bearing sleeve 3, a fluid path formed by the axial groove 4d1 of the second bearing sleeve 4, and each bearing gap (radial bearing gap of first radial bearing part R1 and second radial bearing part R2, and thrust bearing gap of first thrust bearing part T1 and second thrust bearing part T2). Then, the lubricating oil filled in the interior space of the housing 2 flows and circulates through the circulating paths, and hence the pressure balance of the lubricating oil can be maintained. Simultaneously, generation of air bubbles involved in local generation of negative pressure, leakage and vibration of the lubricating oil caused by the generation of air bubbles, and the like are prevented.

Although not shown, the axial fluid paths formed between both the bearing sleeves 3 and 4, and the housing 2 may be formed by arranging the axial groove in the small diameter inner peripheral surface 2a of the housing 2.

As described above, in the present invention, the thrust bearing parts T1 and T2 are provided between the first and second step surfaces 2d and 2e of the housing 2 and the lower end surfaces 6b and 7b of the seal members 6 and 7, respectively. Accordingly, it suffices that the assembly of both the bearing sleeves 3 and 4 to the housing 2 is performed while taking only the radial positions thereof into consideration. As a result, it is possible to simplify the assembly of the bearing sleeves 3 and 4 so as to achieve cost reduction of the fluid dynamic bearing device 1. Further, the thrust bearing parts T1 and T2 are formed on the outer diameter side when compared with those in the conventional structure, and hence rotational accuracy can be increased in accordance with the increase in the bearing areas (thrust bearing areas).

Further, the bearing sleeves are arranged at two points in the axial direction, and hence it is possible to increase the load resistance with respect to the moment load in accordance with the increase in the bearing span of the radial bearing part, and to facilitate the manufacture of the bearing sleeve. Still further, the coaxiality between the radial bearing surfaces of both the bearing sleeves 3 and 4 is set to be equal to or smaller than 3 µm, and the perpendicularity between the radial bearing surfaces of the bearing sleeves 3 and 4 and the thrust bearing surfaces of the housing 2 is set to be equal to or smaller than 5 µm. Therefore, it is possible to prevent the abrasion caused by the sliding contact of the members, and to provide the fluid dynamic bearing device 1 having high rotational accuracy.

Figure 5:
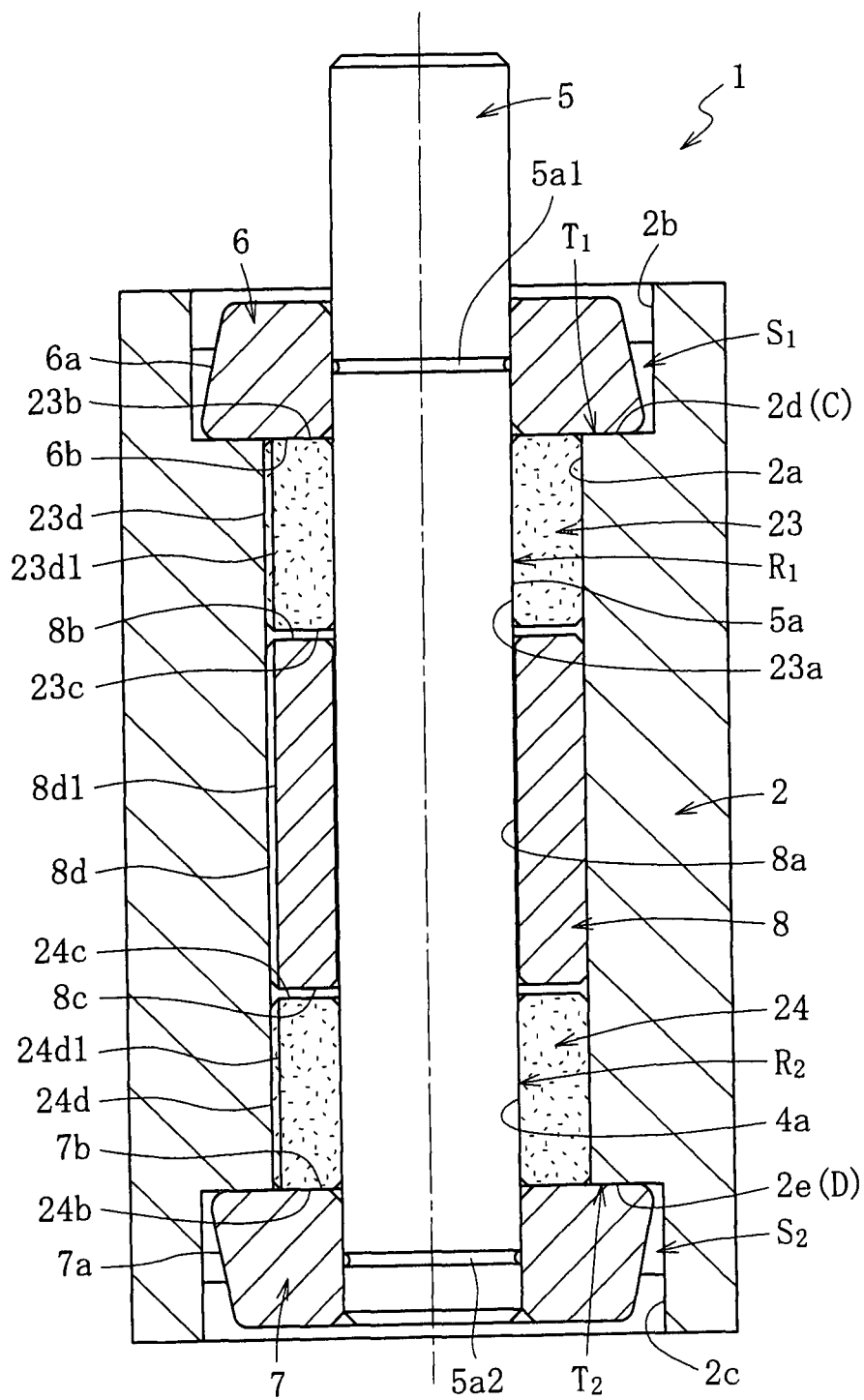
FIG. 5 is a sectional view of a fluid dynamic bearing device according to a second embodiment of the present invention.

FIG. 5 illustrates a fluid dynamic bearing device according to a second embodiment of the present invention. The fluid dynamic bearing device 1 illustrated in FIG. 5 is different from that of the embodiment illustrated in FIG. 1 mainly in that axial dimensions of first and second bearing sleeves 23 and 24 are reduced, and that a ring-shaped spacer 8 is interposed between both the bearing sleeves 23 and 24. While not shown, the axial dimensions of the bearing sleeves 23 and 24 are reduced, and hence the deterioration of the postures of the bearing sleeves 23 and 24 can be overcome as much as possible during assembly. Thus, in this embodiment, a convex part having substantially the same diameter as that of the radial bearing surface is not provided on the inner peripheral surface of each of the bearing sleeves 23 and 24. As a matter of course, when there is a risk of deterioration of the posture during assembly, a convex part having substantially the same diameter as that of the radial bearing surface may be provided on the inner peripheral surface of each of the bearing sleeves 23 and 24.

The spacer 8 is fixed to the substantially central part of the small diameter inner peripheral surface 2a of the housing 2 while an lower end surface 8c thereof is positioned at a point which is axially spaced apart from the second step surface 2e of the housing 2 by a predetermined dimension. The spacer 8 is made of a non-porous material such as a soft metal material including brass, other metal materials, and a resin material so as to have an inner diameter dimension larger than those of both the bearing sleeves 23 and 24. Accordingly, a radial bearing gap is not formed between an inner peripheral surface 8a of the spacer 8 and the outer peripheral surface 5a of the shaft member 5. Note that, because of the similarity to the first embodiment, other matters are denoted by the same reference symbols thereof, and redundant description thereof is omitted.

In the following, an assembly process for the fluid dynamic bearing device 1 illustrated in FIG. 5 is described while putting an emphasis on the process (FIGS. 6a to 6c) of positioning and fixing the bearing sleeves 3 and 4 and the spacer 8 to the inner periphery of the housing 2. Note that, also in the description of the process, substantially the same structure as that of FIGS. 4a and 4b is described while denoted by the same reference symbols, and redundant description thereof is omitted.

First, as illustrated in FIG. 6a, the spacer 8 is subjected to gap-filling bonding to the inner peripheral surface 2a of the housing 2 while the lower end surface 8c thereof is axially spaced apart from the second step surface 2e of the housing 2 by a predetermined dimension. In this case, unlike the structure illustrated in FIG. 4, with use of a positioning part 18 having an upper end surface 18b which shares an axial clearance equal to the above-mentioned predetermined dimension with an upper end surface 17b of a base part 17 therebetween, the spacer 8 is fixed as in the above-mentioned mode. Incidentally, the spacer 8 is formed such that the inner peripheral surface 8a thereof has a diameter larger than that of the bearing sleeves 3 and 4, and the radial bearing gap is not formed on the inner peripheral side thereof. Thus, the radial fixing accuracy is not a particularly serious problem. As a result, the spacer 8 may be fixed to the small diameter inner peripheral surface 2a of the housing 2 through, for example, press-fitting, instead of being subjected to gap-filling bonding as in the case of the bearing sleeves 3 and 4.

After the fixation of the spacer 8, the above-mentioned assembled article is once detached, and as illustrated in FIG. 6b, the second bearing sleeve 4 is subjected to gap-filling bonding to the small diameter inner peripheral surface 2a of the housing 2 on one end side of the spacer 8 (lower side in FIG. 5). After the fixation by bonding, the assembled article is detached to which the second bearing sleeve 4 is assembled, and as illustrated in FIG. 6c, the first bearing sleeve 3 is subjected to gap-filling bonding to the small diameter inner peripheral surface 2a on the other end side (upper side in FIG. 5). In this manner, the shaft member 5 is inserted along the inner peripheries of the bearing sleeves 3 and 4 assembled to the small diameter inner peripheral surface 2a of the housing 2 and of the spacer 8, and the seal members 6 and 7 are fixed to predetermined points of the shaft member 5 while maintaining a predetermined axial gap width. Further, the lubricating oil is filled in the interior space of the housing 2 thereafter, to thereby complete a fluid dynamic bearing device 21 having the structure illustrated in FIG. 5.

In the fluid dynamic bearing device 1 in this embodiment, the non-porous spacer 8 is substituted for a part of the bearing sleeve made of a sintered metal, and hence the amount of the lubricating oil filled inside the bearing can be reduced. Accordingly, it is possible to reduce the axial dimensions (volumes) of the seal spaces S1 and S2, and to increase the bearing span of the radial bearing parts R1 and R2. With this structure, the load resistance (moment rigidity) with respect to the moment load can be further increased.

Figure 14:
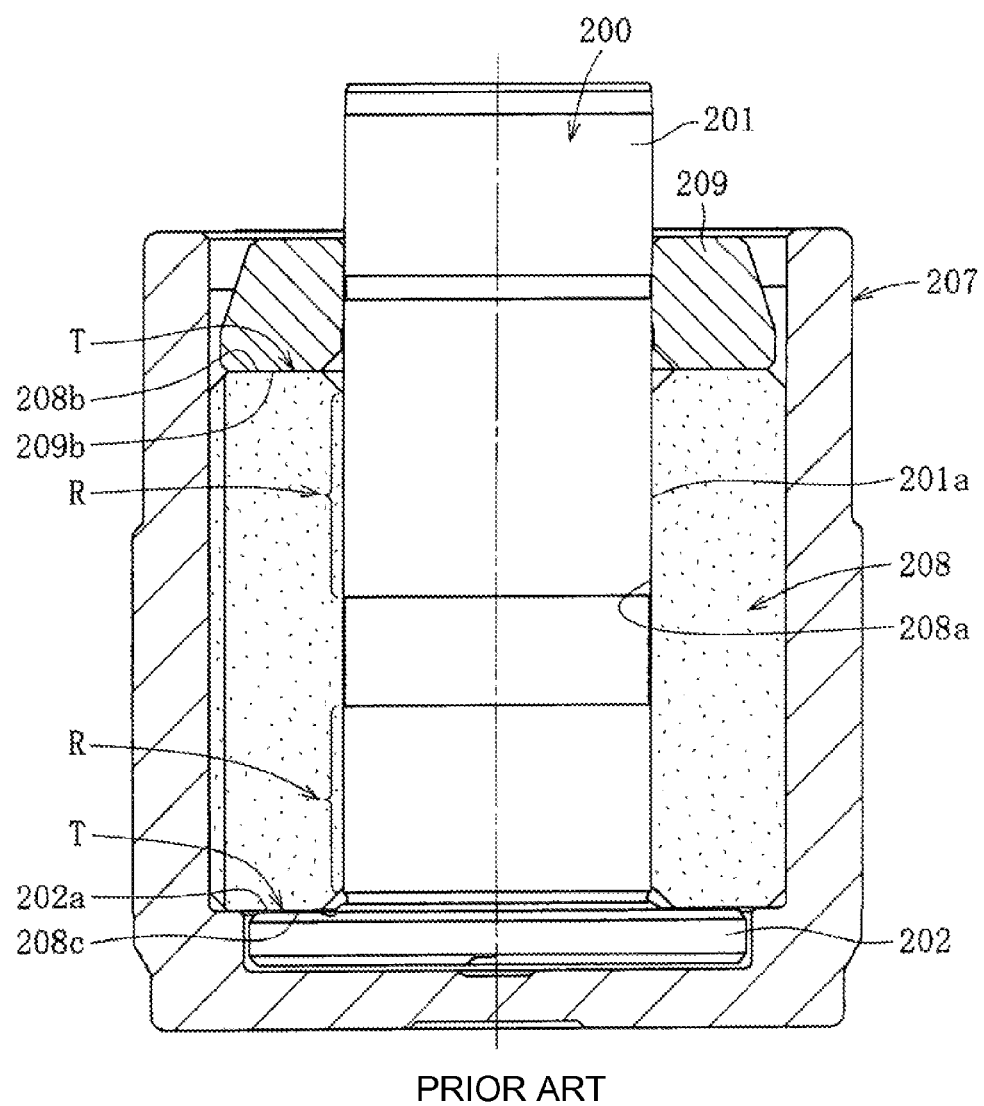
FIG. 14 is a sectional view of a fluid dynamic bearing device having a conventional structure.

Note that, in the above description, the structure is described in which the bearing sleeve is arranged at multiple points (two points) in the axial direction. Also in the structure as illustrated in FIG. 14 in which a single bearing sleeve is used, the housing can be provided with a step surface, and the thrust bearing parts T1 and T2 can be formed on the end side thereof. With this structure, it is possible to facilitate the assembly of the bearing sleeve when compared with that in the conventional structure so as to achieve cost reduction, and possible to increase the moment rigidity (not shown).

Further, the bearing sleeve may be arranged at three or more points instead of one or two points in the axial direction.

In the above description, the structure is illustrated in which the dynamic pressure effect of the lubricating oil is generated with use of the dynamic pressure grooves having a herringbone shape, a spiral shape, or the like and serving as the radial bearing parts R1 and R2 and the thrust bearing parts T1 and T2. The present invention is not limited thereto. For example, while not shown, regarding one of or both the radial bearing parts R1 and R2, the following may be adopted, for example: a so-called step bearing which is equiangularly provided with multiple axial grooves in the region that constitutes the radial bearing surface, or a so-called multi-arc bearing which is provided with multiple arc surfaces in the region that constitutes the radial bearing surface. In addition, regarding one of or both the thrust bearing parts T1 and T2, the following may be adopted, for example: a so-called step bearing which is equiangularly provided with multiple radial grooves in the region that constitutes the thrust bearing surface, a so-called corrugated bearing (corrugated step shape), or the like.

Further, in the above description, the lubricating oil is exemplified as lubricant fluid filled inside the fluid dynamic bearing device 1. Alternatively, it is possible to use fluid including gas such as air, magnetic fluid, or the like, which is capable of generating the dynamic pressure in the bearing gaps.

Figure 7:
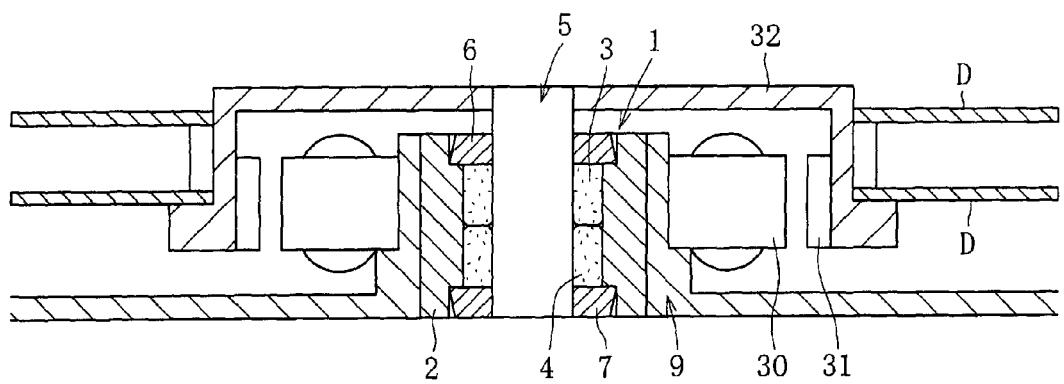
FIG. 7 is a schematic view illustrating an example of a spindle motor in which the fluid dynamic bearing device is incorporated.

FIG. 7 conceptually illustrates a structural example of a spindle motor for an HDD in which the fluid dynamic bearing device 1 according to an embodiment of the present invention, in particular, to the embodiment illustrated in FIG. 1, is incorporated. The spindle motor includes the fluid dynamic bearing device 1, a rotor (disk hub) 32 mounted to the shaft member 5 of the fluid dynamic bearing device 1, and a stator coil 30 and a rotor magnet 31 opposed to each other through an intermediation of, for example, a gap in the radial direction. The stator coil 30 is attached to the outer periphery of a bracket 9, and the rotor magnet 31 is attached to the inner periphery of the disk hub 32. The housing 2 of the fluid dynamic bearing device 1 is mounted to the inner periphery of the bracket 9. One or multiple disks D such as magnetic disks are held by the disk hub 32. When the stator coil 30 is energized, the rotor magnet 31 is rotated by an electromagnetic force between the stator coil 30 and the rotor magnet 31, whereby the disk hub 32 and the disks D held by the disk hub 32 are rotated integrally with the shaft member 5.

The fluid dynamic bearing device 1 having the above-mentioned structure is suitably applicable as a bearing device for an electronic equipment such as an information apparatus, specifically, applicable not only to the above-mentioned spindle motor for an HDD, but also to a spindle motor which is mounted to an information apparatus which includes an optical disk drive for a CD-ROM, a CD-R/RW, a DVD-ROM/RAM, or the like, or includes a magneto-optical disk drive for an MD, an MO, or the like. Further, the fluid dynamic bearing device 1 having the above-mentioned structure is suitably applicable to a disk drive device to which multiple disks D are mounted in accordance with the increase in capacity of the information apparatus, or also to a motor which is required to have high rotational capacity under high-speed rotation.

For the above-mentioned reason, it is possible to suitably apply the fluid dynamic bearing device according to the present invention not only to the spindle motor, but also to other motors which are required to have high rotational accuracy, for example, a fan motor.

Figure 8:
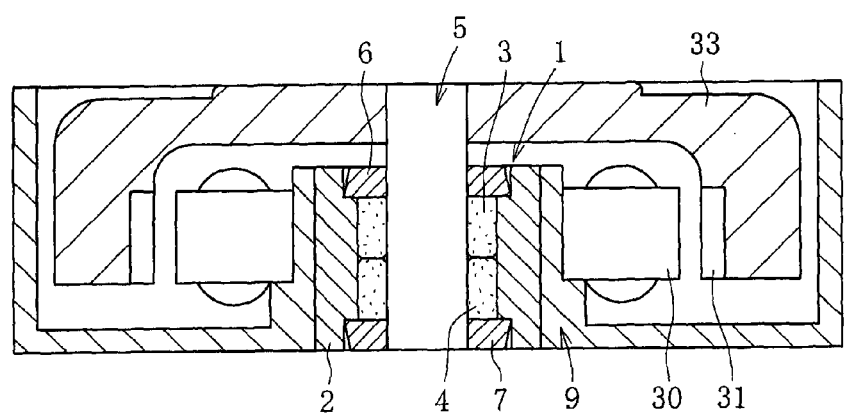
FIG. 8 is a schematic view illustrating an example of a fan motor in which the fluid dynamic bearing device is incorporated.

FIG. 8 conceptually illustrates an example of a fan motor in which the fluid dynamic bearing device 1 according to the first embodiment of the present invention is incorporated, in particular, of a so-called radial gap type fan motor in which the stator coil 30 and the rotor magnet 31 are opposed to each other through an intermediation of a gap in the radial direction. The motor illustrated in FIG. 8 is structurally different from the spindle motor illustrated in FIG. 7 mainly in that a rotor 33 which is fixed to the upper end outer periphery of the shaft member 5 has a fin on the outer peripheral surface thereof, and that the bracket 9 functions as a casing for accommodating the components of the motor. Note that, the other members have the same function and effect as those of the members of the spindle motor illustrated in FIG. 7, and hence redundant description thereof is omitted while denoted by the same reference symbols.

Figure 9:
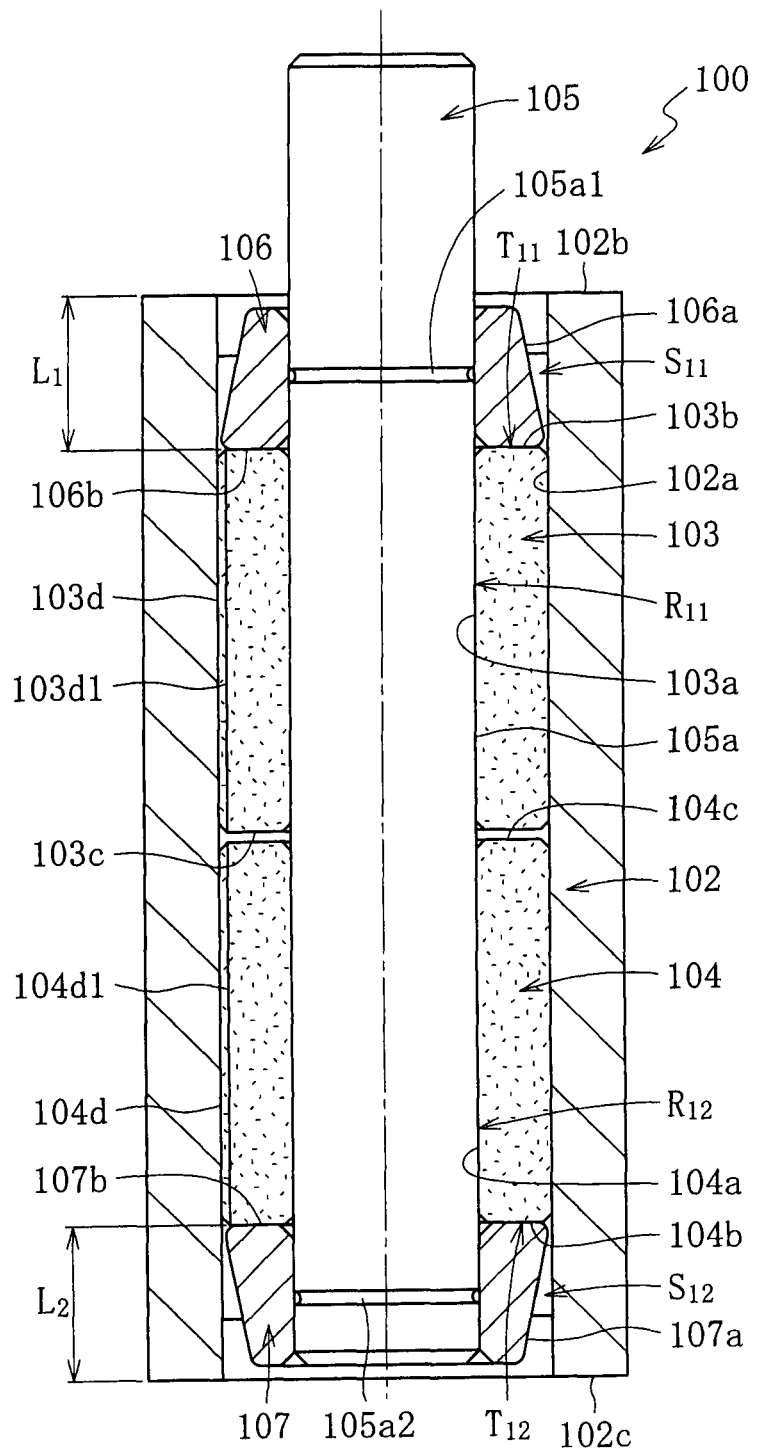
FIG. 9 is a sectional view of a fluid dynamic bearing device according to a third embodiment of the present invention.

FIG. 9 illustrates a fluid dynamic bearing device 101 according to a third embodiment. The fluid dynamic bearing device 101 is used while being incorporated in, for example, a spindle motor for an HDD. This fluid dynamic bearing device 101 mainly includes a housing 102, two bearing sleeves provided to the inner periphery of the housing (first bearing sleeve 103 and second bearing sleeve 104), and a shaft member 105 inserted along the inner peripheries of the first and second bearing sleeves 103 and 104.

As described later, in the fluid dynamic bearing device 101 illustrated in FIG. 9, a first radial bearing part R11 is provided between an inner peripheral surface 103a of the first bearing sleeve 103 and an outer peripheral surface 105a of the shaft member 105, and a second radial bearing part R12 is provided between an inner peripheral surface 104a of the second bearing sleeve 104 and the outer peripheral surface 105a of the shaft member 105. Further, a first thrust bearing part T11 is provided between an upper end surface 103b of the first bearing sleeve 103 and an lower end surface 106b of a seal member 106, and a second thrust bearing part T12 is provided between a lower end surface 104b of the second bearing sleeve 104 and an upper end surface 107b of a seal member 107.

The housing 102 is formed, for example, into substantially a cylindrical shape by injection molding of a resin material, and an inner peripheral surface 102a thereof is formed to have a cylindrical surface while being straight over the entire length in the axial direction. The inner peripheral surface 102a is formed to have a diameter larger than outer diameter dimensions of the bearing sleeves 103 and 104 described later.

For the base resin used in the resin material to form the housing 102, any type can be used as long as it can be injection molded regardless of whether it is amorphous resin or crystalline resin. For example, polysulfone (PSU), polyethersulfone (PES), polyphenylsulfone (PPSU), polyetherimide (PEI), and the like are used for amorphous resin, and liquid crystal polymer (LCP), polyether ether ketone (PEEK), polybutylene telephtalate (PBT), polyphenylene sulfide (PPS), and the like are used for crystalline resin. Those are obviously just examples, and other base resin can be used in view of use environment, an application, etc. Further, for the purposes of increasing strength and imparting conductivity, one or two or more types of well-known various fillers may be compounded with the above-mentioned base resins.

Alternatively, the housing 102 can be made of a soft metal material including brass and an aluminum alloy, or other metal materials. As described above, when the housing 102 is made of a metal material, it is possible to form the housing 102 by machining process such as cutting, or by injection molding of a molten metal. Examples of the metal material available in the case of injection molding include a low-melting metal such as a magnesium alloy or an aluminum alloy. As described above, when the housing 102 is made of a metal, strength and conductivity can be increased when compared with those in the case of formation with use of a resin material. Further, the housing 102 can be formed by so-called MIM molding in which the mixture of metal powder and a binder is degreased and sintered after injection molding thereof, or by injection molding of ceramic (so-called CIM molding).

The shaft member 105 is made of a metal material such as stainless steel, and has a shaft shape of substantially the same diameter in general. In addition, in this embodiment, the annular seal members 106 and 107 are fixed to the shaft member 105 by an appropriate fixing means such as adhesion or press-fit adhesion (simultaneous use of press-fitting and adhesion). The seal members 106 and 107 are protruded to an outer diameter side from the outer peripheral surface 105a of the shaft member 105, and are accommodated on the inner peripheral side of the inner peripheral surface 102a of the housing 102, respectively. In order to enhance the fixing strength of adhesive, circumferential grooves 105a1 and 105a2 acting as adhesive pool are provided in the regions of the outer peripheral surface 105a of the shaft member 105 that constitutes the fixing positions of the seal members 106 and 107. The seal members 106 and 107 may be made of a soft metal material such as brass or other metal materials, or may be made of a resin material. Any one of the seal members 106 and 107 may be integrally formed with the shaft member 105.

The outer peripheral surface 106a of the seal member 106 forms a seal space S11 of a predetermined volume between itself and the inner peripheral surface 102b on the upper end side of the housing 102, and the outer peripheral surface 107a of the seal member 107 forms a seal space S12 of a predetermined volume between itself and the inner peripheral surface 102a on the lower end side of the housing 102. In this embodiment, the outer peripheral surface 106a of the seal member 106 and the outer peripheral surface 107a of the seal member 107 are respectively formed into a tapered surface shape in which diameter thereof gradually narrows towards the exterior side of the housing 102. Thus, the seal spaces S11 and S12 have a tapered shape gradually narrowing towards the interior side of the housing 102.

The first and second bearing sleeves 103 and 104 are both formed into a cylindrical shape with a porous body made of a sintered metal, in particular, with a porous body of a sintered metal having copper as main component. The bearing sleeves 103 and 104 may be made of a metal material such as a copper alloy other than a sintered metal.

Figure 10A:
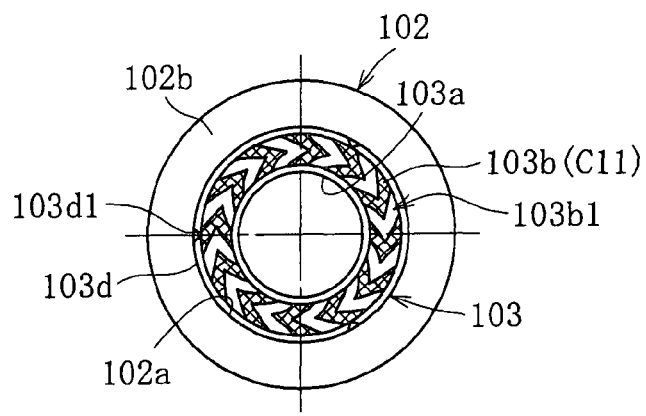
FIG. 10a is a top view illustrating a state in which bearing sleeves are assembled to a housing of the fluid dynamic bearing device illustrated in FIG. 9.
Figure 10B:
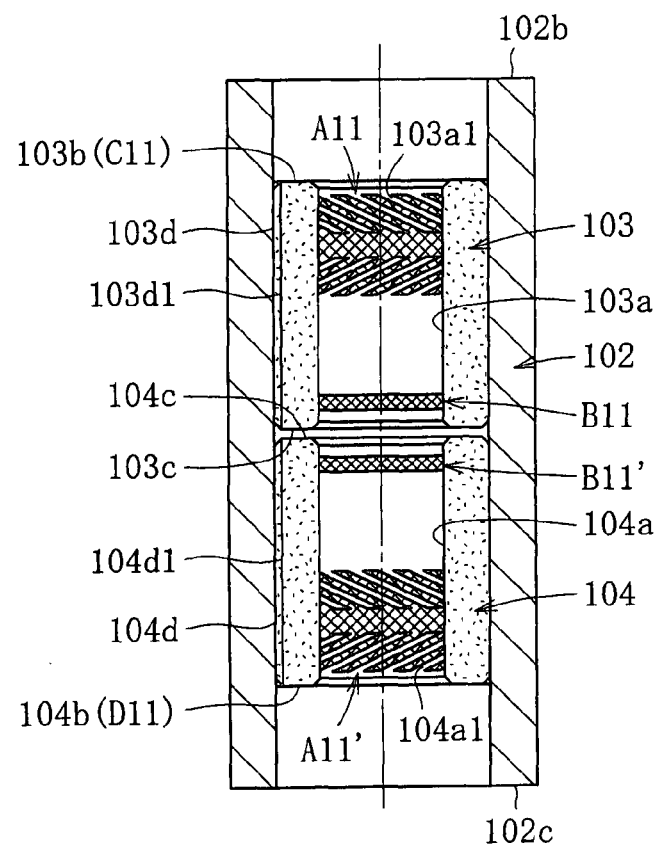
FIG. 10b is a sectional view thereof.

As illustrated in FIG. 10b, a region that constitutes a radial bearing surface A11 of the first radial bearing part R11 is formed in the inner peripheral surface 103a of the first bearing sleeve 103. Dynamic pressure grooves 103a1 of a herringbone shape are formed in the radial bearing surface A11. The radial bearing surface A11 is formed at the end on the side (upper side) away from the second bearing sleeve 104. Further, a band-shaped convex part B11 is formed at an end on the opposite side (lower side) axially spaced apart from the radial bearing surface A11 of the inner peripheral surface 103a. The convex part B11 is formed to have substantially the same diameter as that of a hill part that partitions and forms the dynamic pressure groove 103a1. Multiple (three in the illustrated example) axial grooves 103d1 are equiangularly formed in an outer peripheral surface 103d.

A region that constitutes a radial bearing surface A11' of the second radial bearing part R12 is formed in the inner peripheral surface 104a of the second bearing sleeve 104. Dynamic pressure grooves 104a1 of a herringbone shape are formed in the radial bearing surface A11'. The radial bearing surface A11' is formed at the end on the side (lower side) away from the first bearing sleeve 103. Further, a band-shaped convex part B11' is formed at an end on the opposite side (upper side) axially spaced apart from the radial bearing surface A11' of the inner peripheral surface 104a. The convex part B11' is formed to have substantially the same diameter as that of a hill part that partitions and forms the dynamic pressure groove 104a1. Multiple (three in the illustrated example) axial grooves 104d1 equiangularly arranged are formed in an outer peripheral surface 104d.

Further, as illustrated in FIG. 10a, a region that constitutes a thrust bearing surface C11 of the first thrust bearing part T11 is formed in the partially or entirely annular region of the upper end surface 103b of the first bearing sleeve 103, and dynamic pressure grooves 103b1 of a herringbone shape are formed in the thrust bearing surface C11.

Figure 10C:
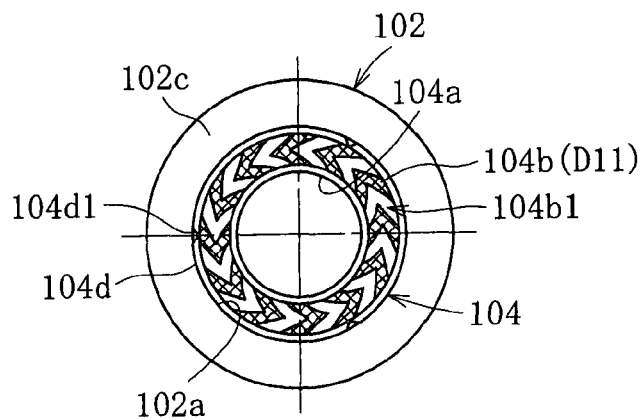
FIG. 10c is a bottom view thereof.

Further, as illustrated in FIG. 10c, a region that constitutes a thrust bearing surface D11 of the second thrust bearing part T12 is formed in the partially or entirely annular region of the lower end surface 104b of the second bearing sleeve 104, and dynamic pressure grooves 104b1 of a herringbone shape are formed in the thrust bearing surface D11. Note that one of or both the dynamic pressure grooves 103b1 and 104b1 may be arranged in another well-known pattern such as a spiral pattern.

In this embodiment, the first bearing sleeve 103 is fixed along the inner periphery of the housing 102 such that the upper end surface 103b thereof is positioned below an upper end surface 102b of the housing 102 in the axial direction by L1. Further, the second bearing sleeve 104 is fixed along the inner periphery of the housing 102 such that the lower end surface 104b thereof is positioned above a lower end surface 102c of the housing 102 in the axial direction by L2. Note that, the dimensions of L1 and L2 are equal to each other in this embodiment.

In the following, while putting an emphasis on the process of fixing the bearing sleeves 103 and 104 along the inner periphery of the housing 102, an assembly method for the fluid dynamic bearing device 101 having the above-mentioned structure is described with reference to the drawings.

Figure 11A:
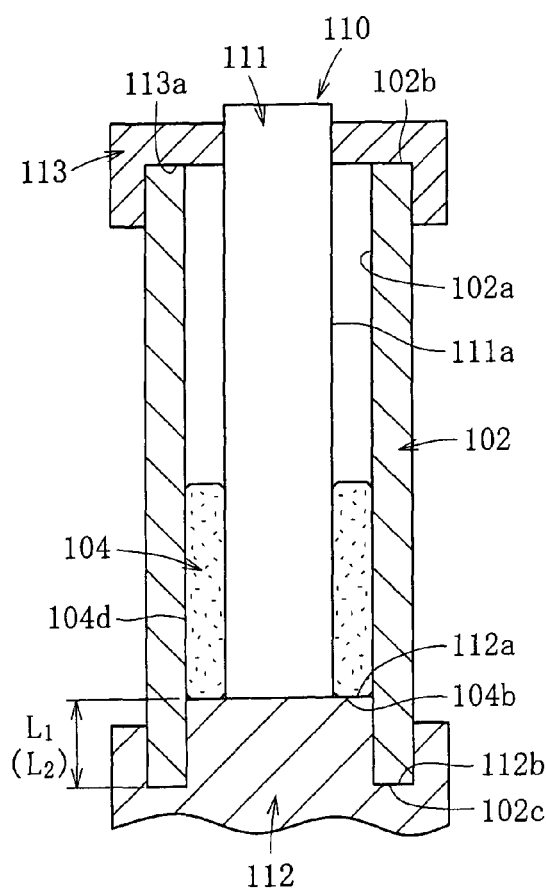
FIGS. 11a and 11b are schematic views illustrating a manufacturing process of the fluid dynamic bearing device according to the third embodiment.
Figure 11B:
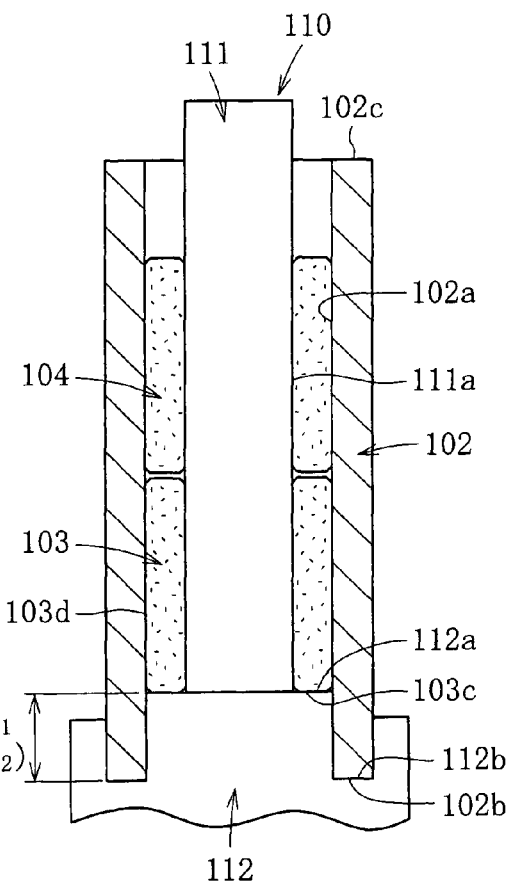

FIGS. 11a and 11b conceptually illustrate an example of a process of positioning and fixing the first and second bearing sleeves 103 and 104 along the inner periphery of the housing 102. An assembly device 110 used in the process includes a base part 112, a pin part 111 provided integrally with or separately from the base part 112, a disk part 113 externally engaged along the outer periphery of the upper end of the pin part 111. The pin part 111 is formed to have an outer diameter dimension in which the bearing sleeves 103 and 104 are slidable and the respective radial bearing surfaces A11 and A11' of the bearing sleeves 103 and 104 are not damaged.

The base part 112 is provided with a concave part on the lower outer diameter side thereof. Between a bottom surface 112b of the concave part and an upper end surface 112a, the dimensions of the axial clearance L2 between the lower end surface 102c of the housing 102 and the lower end surface 104b of the second bearing sleeve 104 and the axial clearance L1 between the upper end surface 102b of the housing 102 and the upper end surface 103b of the first bearing sleeve 103 are set to be equal to each other.

In the above-mentioned assembly device 110, the accuracy of an outer peripheral surface 111a of the pin part 111 directly influences the coaxiality between the radial bearing surfaces A11 and A11' of both the respective bearing sleeves 103 and 104. Therefore, the outer peripheral surface 111a is finished so as to suffice the required coaxiality (equal to or smaller than 3 µm, for example). Further, due to direct influence on the coaxiality (posture of bearing sleeves 103 and 104 with respect to housing 102) between the inner peripheral surface 102a of the housing 102 and the inner peripheral surfaces (radial bearing surfaces) of the bearing sleeves 103 and 104, the coaxiality between the outer peripheral surface of the base part 112 and the outer peripheral surface 111a of the pin part 111 are finished so as to suffice the required coaxiality.

In the above-mentioned structure, as illustrated in FIG. 11a, first, the second bearing sleeve 104 is press-fitted (slightly press-fitted) into the pin part 111, that is, the radial bearing surface A11' is restrained such that the lower end surface 104b thereof is brought into contact with the upper end surface 112a of the base part 112. Next, in a state where an adhesive is applied over a predetermined region of the inner peripheral surface 102a of the housing 102, the lower end surface 102c of the housing 102 is arranged on the outer diameter side of the second bearing sleeve 104 so as to be brought into contact with the bottom surface 112b of the concave part of the base part 112. Further, the disk part 113 is externally engaged with the pin part 111 while the outer peripheral surface and the upper end surface 102b of the housing 102 are restrained with the inner peripheral surface and a lower end surface 113a thereof.

Note that an adhesive such as a thermosetting adhesive, a photo-setting adhesive, or a cold-setting adhesive may be used. In this embodiment, a cold-setting adhesive is used for which a special curing device is not required and which is curable in a short period of time, especially, an anaerobic adhesive is used which can reliably effect fixation by bonding while blocking air such that a special confirmation operation thereof can be omitted.

As described above, the convex part B11' having substantially the same diameter as that of the radial bearing surface A11' is provided in the region of the inner peripheral surface 104a of the second bearing sleeve 104, which is axially spaced apart from the radial bearing surface A11'. Accordingly, by means of the assembly in the above-mentioned mode, it is possible to secure the coaxiality of the inner peripheral surface 104a of the second bearing sleeve 104 with respect to the inner peripheral surface 102a of the housing 102. In this context, the adhesive is cured when air is blocked in this state, whereby the second bearing sleeve 104 is fixed by bonding to the inner peripheral surface 102a of the housing 102 while the lower end surface 104b thereof is positioned at a point axially spaced apart from the lower end surface 102c of the housing 102 by L2.

The above-mentioned assembled article is once detached from the assembly device 110. Next, as illustrated in FIG. 11b, the first bearing sleeve 103 is press-fitted into the pin part 111 such that the upper end surface 103b is brought into contact with the upper end surface 112a of the base part 112. Then, in a state where the top and bottom of the above-mentioned assembled article is inverted and an adhesive is applied in the predetermined region of the inner peripheral surface 102a of the housing 102, the assembled article is arranged on the outer diameter side of the first bearing sleeve 103 such that the upper end surface 102b of the housing 102 is brought into contact with the bottom surface 112b of the recessed part of the base part 112. The adhesive is cured when air is blocked in this state, whereby the first bearing sleeve 103 is fixed by bonding while the upper end surface 103b thereof is positioned at a point axially spaced apart from the upper end surface 102b of the housing 102 by L1.

In this case, as in the above-mentioned case, the convex part B11 having substantially the same diameter as that of the radial bearing surface A11 is provided also on the inner peripheral surface 103a of the first bearing sleeve 103. Thus, the coaxiality of the inner peripheral surface 103a of the first bearing sleeve 103 is secured with respect to the inner peripheral surface 102a of the housing 102. Further, both the first bearing sleeve 103 and the second bearing sleeve 104 are press-fitted into the pin part 111, and hence a coaxiality is secured between the radial bearing surface A11 of the first bearing sleeve 103 and the radial bearing surface A11' of the second bearing sleeve 104. Note that, in the state illustrated in FIG. 11b, the second bearing sleeve 104 is positioned on the upper outer diameter side of the pin part 111, and hence the posture of the housing 102 is not deteriorated even without the disk part 113 externally engaged at the upper end of the pin part 111 as in the process illustrated in FIG. 11a, whereby the demanded accuracy is secured. As a matter of course, as in the case where the second bearing sleeve 104 is fixed to the housing 102, the disk part 113 may be externally engaged at the upper end of the pin part 111.

Incidentally, as described above, the inner peripheral surface 102a of the housing 102 is formed to have a diameter larger than those of the respective outer peripheral surfaces 103d and 104d of both the bearing sleeves 103 and 104. Accordingly, the fixation by bonding of both the bearing sleeves 103 and 104 to the housing 102 is so-called gap-filling bonding. With the fixation by means of the gap-filling bonding, even when there is a variation between the radial shapes of the bearing sleeves 103 and 104, the variation can be absorbed with use of a gap eliminated by bonding. As a result, the coaxiality can be reliably secured between both the radial bearing surfaces A11 and A11'. Note that, the excessively large width of the gap eliminated by bonding leads to the deterioration in bonding strength, and in contrast, the excessively small width thereof leads to the insufficiency of radial adjustment allowance. For this reason, the width of the gap eliminated by bonding is set to 10 µm to 50 µm, or more preferably, to approximately 15 µm to 20 µm.

While in the above description, the second bearing sleeve 104 is first fixed to the inner peripheral surface 102a of the housing, as a matter of course, the second bearing sleeve 104 may be fixed to the housing 102 after the fixation of the first bearing sleeve 103 to the housing 102. Further, the above-mentioned assembly process may be performed after the application of an adhesive on the outer peripheral surfaces of the bearing sleeves 103 and 104 instead of the inner peripheral surface 102a of the housing 102. Further, in this embodiment, the case is illustrated where the clearances L1 and L2 are the same which are respectively measured from both the end surfaces of the housing 102 to the one end surfaces 103b and 104b of the bearing sleeves 103 and 104. When those members are different from each other, with use of the base parts 112 in each of which the upper end surface 112a and the bottom surface 112b of the recessed part are separated at a different clearance, the bearing sleeves 103 and 104 can be fixed to the inner peripheral surface 102a as in the above-mentioned case while maintaining a predetermined clearance measured from the end surface of the housing 102.

As a result of the fixation of both the bearing sleeves 103 and 104 to the housing 102 as described above, predetermined spaces are secured on the end sides of the first and second bearing sleeves 103 and 104, and the coaxiality is secured between both the radial bearing surfaces A11 and A11'. Then, the shaft member 105 is inserted along the inner peripheries of both the bearing sleeves 103 and 104, and both the seal members 106 and 107 are respectively fixed to the outer peripheries of the circumferential grooves 105a1 and 105a2 of the shaft member 105 while maintaining a predetermined axial gap width. Note that any one of the seal members 106 and 107 may be fixed in advance prior to insertion, or may be formed integrally with the shaft member 105.

After the assembly is completed through the above-mentioned processes, lubricating oil etc. is filled as lubricant fluid to the internal space of the housing 102 sealed with the seal members 106 and 107 including an internal air hole of the bearing sleeves 103 and 104 (internal air hole of porous body). The lubricating oil can be filled by immersing the assembly-completed fluid dynamic bearing device 101 in the lubricating oil in a vacuum bath and then being opened to atmospheric pressure.

Note that, as a result of the fixation of both the bearing sleeves 103 and 104 to the inner peripheral surface 102a of the housing 102 in the above-mentioned mode, as illustrated in FIGS. 9 to 11, a slight gap is formed in some cases between a lower end surface 103c of the first bearing sleeve 103 and an upper end surface 104c of the second bearing sleeve 104. As a matter of course, both the bearing sleeves 103 and 104 are brought into contact with each other at some axial dimensions of the first and second bearing sleeves 103 and 104 and the housing 102.

In the fluid dynamic bearing device 101 of the above-mentioned structure, when the shaft member 105 rotates, the radial bearing surface A11 of the inner peripheral surface 103a of the first bearing sleeve 103 faces the outer peripheral surface 105a of the shaft member 105 by way of the radial bearing gap. In the radial bearing surface A11, the pressure of the lubricating oil filled in the radial bearing gap is increased by the dynamic pressure effect of the dynamic pressure groove 103a1, and the shaft member 105 is rotatably supported in a non-contact manner in the radial direction by such pressure. In this embodiment, the radial bearing gap is formed between the convex part B11 and the outer peripheral surface 105a of the shaft member 105, and an oil film is formed in the radial bearing gap by the oil exuded from the first bearing sleeve 103, and hence the shaft member 105 is rotatably supported in the radial direction by the oil film. As a result, the dynamic pressure bearing and a cylindrical bearing constitute the first radial bearing part R11 that rotatably supports the shaft member 105 in the radial direction in a non-contact manner. The dynamic pressure bearing is constructed of the radial bearing surface A11' in the second bearing sleeve 104 as well, and the cylindrical bearing is constructed of the convex part B11', and the second radial bearing part R12 that rotatably supports the shaft member 105 in the radial direction in a non-contact manner is constructed.

When the shaft member 105 rotates, the thrust bearing surface C11 of the upper end surface 103b of the first bearing sleeve 103 faces the lower end surface 106b of the seal member 106 by way of the predetermined thrust bearing gap, and the thrust bearing surface D11 of the lower end surface 104b of the second bearing sleeve 104 faces the upper end surface 107b of the seal member 107 by way of the predetermined thrust bearing gap. With the rotation of the shaft member 102, the pressure of the lubricating oil filled in each thrust bearing gap is increased by the dynamic pressure effect of the dynamic pressure grooves 103b1 and 104b1, and the shaft member 105 is rotatably supported in a non-contact manner in both thrust directions. The first thrust bearing part T11 and the second thrust bearing part T12 for rotatably supporting the shaft member 105 in a non-contact manner in both thrust directions are thereby formed.

In the rotation of the shaft member 105, the seal spaces S11 and S12 formed on the outer peripheral side of the seal members 106 and 107 as described above have a tapered shape gradually narrowing towards the inner side of the housing 102, and hence the lubricating oil in both seal spaces S11 and S12 is drawn in the direction the seal space narrows, that is, towards the inner side of the housing 102 by the drawing action by the capillary force and the drawing action by centrifugal force in rotation. The leakage of the lubricating oil from the interior of the housing 102 is thereby effectively prevented. Further, the seal spaces S11 and S12 have a buffer function of absorbing the amount of change in volume involved in the change in temperature of the lubricating oil filled in the interior space of the housing 102, and the fluid level of the lubricating oil is always within the seal spaces S11 and S12 within a range of the expected temperature change.

A series of circulating paths is formed inside the housing 102 by a fluid path formed by the axial groove 103d1 of the first bearing sleeve 103, a fluid path formed by the axial groove 104d1 of the second bearing sleeve 104, and each bearing gap (radial bearing gap of the first radial bearing part R11 and the second radial bearing part R12, thrust bearing gap of the first thrust bearing part T11 and the second thrust bearing part T12). As the lubricating oil filled in the interior space of the housing 102 flows and circulates through the circulating path, the pressure balance of the lubricating oil can be maintained, and at the same time, generation of air bubbles involved in local generation of negative pressure, leakage and vibration of the lubricating oil caused by the generation of air bubbles, and the like are prevented. One end of the fluid path formed by the axial groove 103d1 of the first bearing sleeve 103 and one end of the fluid path formed by the axial groove 104d1 of the second bearing sleeve 104 communicate to the seal spaces S11 and S12, respectively, which is the atmosphere opened side. Thus, even when air bubbles mix in the lubricating oil for some reason, the air bubbles are discharged to the outside air opened side when circulating with the lubricating oil, and hence adverse affects by the air bubbles can be more effectively prevented.

Figure 12:
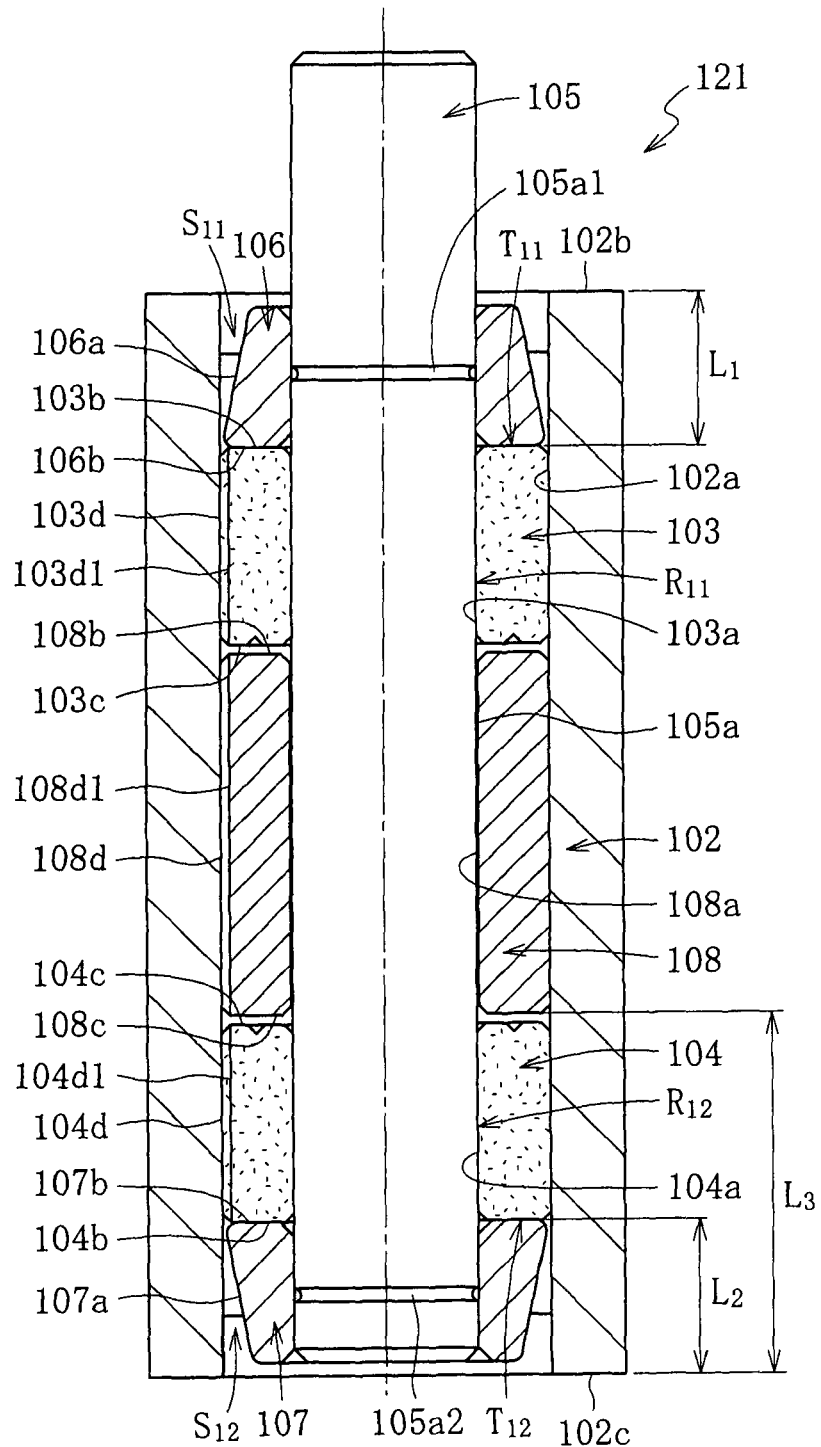
FIG. 12 is a sectional view of a fluid dynamic bearing device according to a fourth embodiment of the present invention.

FIG. 12 illustrates a fluid dynamic bearing device according to a fourth embodiment of the present invention. The fluid dynamic bearing device 121 of this embodiment is different from the fluid dynamic bearing device 101 illustrated in FIG. 9 in that a ring-shaped spacer 108 is interposed between the first and second bearing sleeves 103 and 104. The spacer 108 is fixed to a point of the inner peripheral surface 102a of the housing, at which a lower end surface 108c thereof is axially spaced apart from the lower end surface 102c of the housing 102 by L3. The spacer 108 is made of an elastic metal material including brass, other metal materials, a resin material, or a sintered metal material so as to have an inner diameter dimension larger than those of both the bearing sleeves 103 and 104. Accordingly, a radial bearing gap is not formed between an inner peripheral surface 108a of the spacer 108 and the outer peripheral surface 105a of the shaft member 105. Note that, because of the similarity of the other matters to the third embodiment, substantially the same members and parts are denoted by the same reference symbols, and redundant description thereof is omitted.

In the following, an assembly process for the fluid dynamic bearing device 121 having the above-mentioned structure is described while putting an emphasis on the process (FIGS. 13a to 13c) of positioning and fixing the bearing sleeves 103 and 104 and the spacer 108 to the inner periphery of the housing 102. Note that, also in the description of the process, substantially the same structure as that of FIGS. 10a and 10b is described while denoted by the same reference symbols, and redundant description thereof is omitted.

Figure 13:
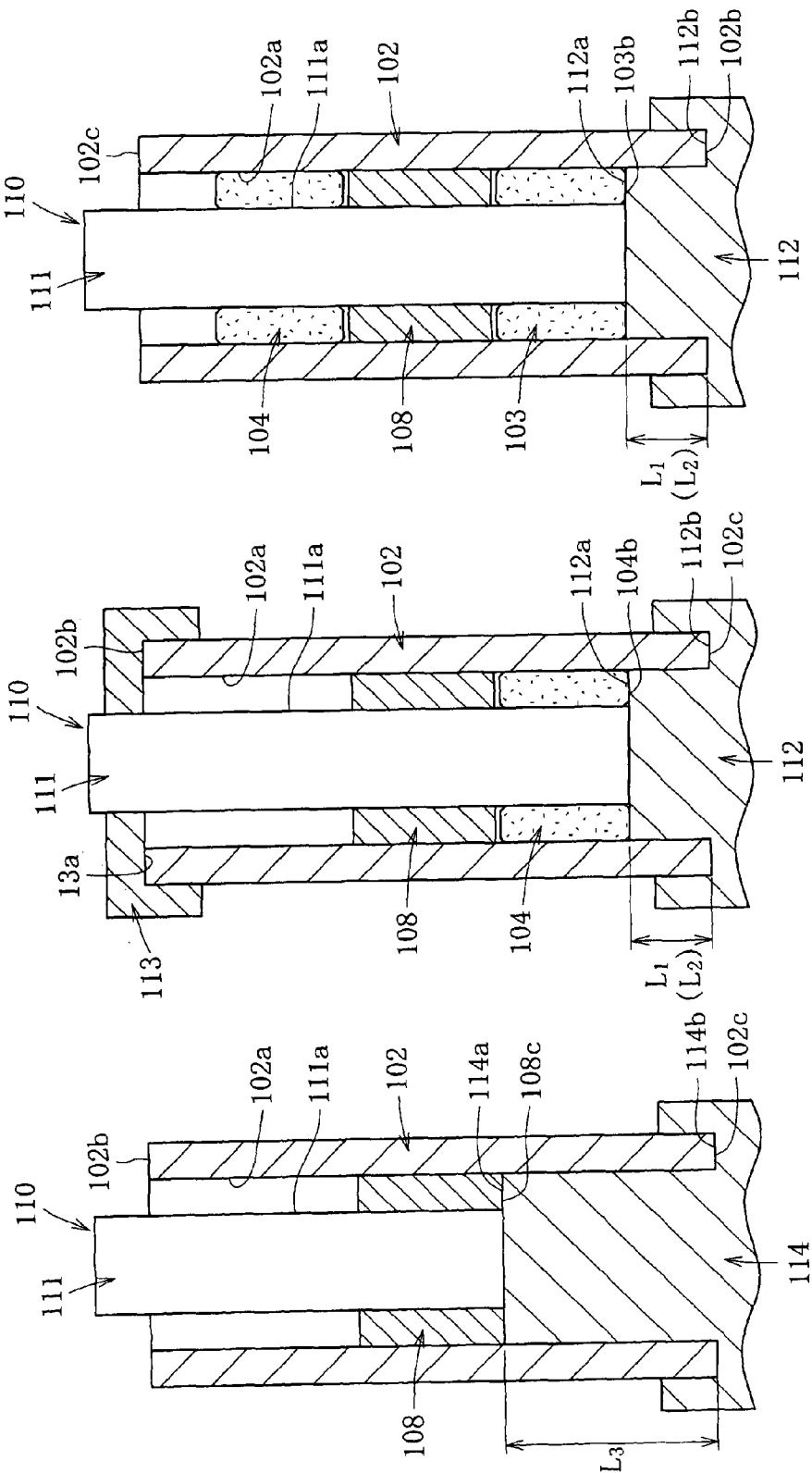
FIGS. 13a to 13c are schematic views illustrating a manufacturing process of the fluid dynamic bearing device according to the fourth embodiment.

First, as illustrated in FIG. 13a, the spacer 108 is fixed to the inner peripheral surface 102a of the housing 102, for example, by gap-filling bonding while the lower end surface 108c thereof is axially spaced apart from the lower end surface 102c of the housing 102 by L3. In this case, unlike the structure illustrated in FIG. 10, with use of a base part 114 in which a clearance between an upper end surface 114a thereof and a bottom surface 114b of the recessed part is equal to L3, the spacer 108 is fixed as in the above-mentioned mode. Incidentally, the spacer 108 is formed such that the inner peripheral surface 108a thereof has a diameter larger than those of the bearing sleeves 103 and 104, and the radial bearing gap is not formed on the inner peripheral side thereof. Thus, the radial fixing accuracy is not a particularly serious problem. As a result, the spacer 108 may be fixed to the inner peripheral surface of the housing through, for example, press-fitting or press-fit bonding, instead of being subjected to gap-filling bonding as in the case of being bonded to the bearing sleeves 103 and 104.

After the fixation of the spacer 108, the above-mentioned assembled article is once detached, and as illustrated in FIG. 13b, the second bearing sleeve 104 is fixed (gap-filling bonding) to the inner peripheral surface 102a of the housing 102 below the spacer 108. After the fixation, the assembled article is detached to which the second bearing sleeve 104 is assembled, and as illustrated in FIG. 13c, the first bearing sleeve 103 is fixed (gap-filling bonding) to the inner peripheral surface 102a on the other end side. In this manner, the shaft member 105 is inserted along the inner peripheries of the bearing sleeves 103 and 104 assembled to the inner peripheral surface 102a of the housing 102 and of the spacer 108, and the seal members 106 and 107 are fixed to predetermined points of the shaft member 105 while maintaining a predetermined axial gap width. Further, the lubricating oil is filled in the interior space of the housing 102 thereafter, to thereby complete a fluid dynamic bearing device 121 illustrated in FIG. 12.

In the above-mentioned mode, by means of the fixation of both the bearing sleeves 103 and 104 and the spacer 108, it is possible to secure the coaxiality between the radial bearing surfaces of both the bearing sleeves 103 and 104, to secure the coaxiality of the inner peripheral surfaces 103a and 104a of both the respective bearing sleeves 103 and 104 with respect to the inner peripheral surface 102a of the housing 102, and to fix the members while predetermined clearances are secured from the end surface of the housing 102. Note that, as a result of the fixation of both the bearing sleeves 103 and 104 and the spacer 108 to the inner peripheral surface 102a of the housing 102 in the above-mentioned mode, as illustrated in FIG. 12, a slight gap is formed in some cases between the first bearing sleeve 103 and the spacer 108, and between the second bearing sleeve 104 and the spacer 108. As a matter of course, both the bearing sleeves 103 and 104 are brought into contact with the spacer 108 at some axial dimensions of both the bearing sleeves 103 and 104, the spacer 108, and the housing 102.

In the above description, the structure is illustrated in which the dynamic pressure effect of the lubricating oil is generated with use of the dynamic pressure grooves having a herringbone shape, a spiral shape, or the like and serving as the radial bearing parts R11 and R12 and the thrust bearing parts T11 and T12 of the fluid dynamic bearing devices 101 and 121. In this context, as one of or both the radial bearing parts R11 and R12, there may be adopted, for example, a so-called step bearing which is equiangularly provided with multiple axial grooves in the region that constitutes the radial bearing surface, or a so-called multi-arc bearing which is provided with multiple arc surfaces in the region that constitutes the radial bearing surface. In addition, as one of or both the thrust bearing parts T11 and T12, there may be adopted, for example, a so-called step bearing which is equiangularly provided with multiple radial grooves in the region that constitutes the thrust bearing surface, a corrugated bearing (corrugated step shape), or the like.

Further, in the above description, a mode is exemplified in which both the first radial bearing part R11 and the second radial bearing part R12 include dynamic pressure bearings. Alternatively, one of or both the first radial bearing part R11 and the second radial bearing part R12 may include cylindrical bearings.

Still further, in the above description, the lubricating oil is exemplified as fluid filled inside the fluid dynamic bearing devices 101 and 121. Alternatively, it is possible to use fluid including gas such as air, magnetic fluid, or the like, which is capable of generating the dynamic pressure in the bearing gaps.

The fluid dynamic bearing device having the above-mentioned structure can be suitably used in a motor which is necessary to be rotated at high speed an have excellent moment rigidity, for example, in a spindle motor of an HDD for a server.

DESCRIPTION OF THE SYMBOLS 1 fluid dynamic bearing device
2 housing
3 first bearing sleeve
4 second bearing sleeve
5 shaft member
6, 7 seal member,
8 spacer
11 pin part
12 base part
13 positioning part
A, A' radial bearing surface
C, D thrust bearing surface
R1, R2 radial bearing part
T1, T2 thrust bearing part
S1, S2 seal space
101, 121 fluid dynamic bearing device
102 housing
103 first bearing sleeve
104 second bearing sleeve
106, 107 seal member
108 spacer
110 assembly device
111 pin part
112 base part
A11, A11' radial bearing surface
C11, D11 thrust bearing surface
L1, L2, L3 axial clearance
R11, R12 radial bearing part
T11, T12 thrust bearing part
S11, S12 seal space

The invention claimed is:
1. A fluid dynamic bearing device, comprising:
a bearing sleeve having a radial bearing surface;
a housing having an inner periphery along which the bearing sleeve is inserted and fixed;
a shaft member inserted along an inner periphery of the bearing sleeve;
a protruding part provided at each end of the bearing sleeve protruding from an outer diameter side of the shaft member;
a radial bearing gap formed between the radial bearing surface of the bearing sleeve and an outer peripheral surface of the shaft member to support the shaft member in a non-contact manner with a dynamic pressure of a lubricant fluid generated in the radial bearing gap; and
a thrust bearing which is formed between the housing and each protruding part and which has a dynamic pressure generating part and a thrust bearing gap, the dynamic pressure generating part facing the thrust bearing gap in an axial direction in which a dynamic pressure of the lubricant fluid is generated to support the shaft member in a non-contact manner in the axial direction,
wherein the housing has
a small diameter inner peripheral surface as a fixing part of the bearing sleeve,
a large diameter inner peripheral surface positioned on an outer diameter side of each protruding part, and
a step surface extending in a radial direction and connecting the small diameter inner peripheral surface and the large diameter inner peripheral surface such that the step surface is formed radially outside of the small diameter inner peripheral surface, the step surface facing a surface of each protruding part in the axial direction, the dynamic pressure generating part of the thrust bearing being formed on the step surface or on the surface of each protruding part such that it is axially aligned with the step surface.
2. A fluid dynamic bearing device according to claim 1, wherein:
the bearing sleeve comprises multiple bearing sleeves arranged in the axial direction;

a coaxiality between the radial bearing surface of each of the bearing sleeves is set to be equal to or smaller than 3 μm; and a perpendicularity between the respective radial bearing surface of the bearing sleeves and the respective thrust bearing surfaces of the housing is set to be equal to or smaller than 5 μm.

3. A fluid dynamic bearing device according to claim 1 or 2, wherein the bearing sleeve is fixed by gap-filling bonding.

4. A fluid dynamic bearing device according to claim 2, further comprising a non-porous spacer interposed between two bearing sleeves of said multiple bearing sleeves.

5. A fluid dynamic bearing device according to claim 1, wherein the housing is formed by die molding.

* * * * *